(12) United States Patent
Hunsaker et al.

(10) Patent No.: US 11,995,591 B2
(45) Date of Patent: May 28, 2024

(54) COMPUTER PLATFORM FOR CONTROLLING AGRICULTURAL ASSETS

(71) Applicant: ACUITUS AG, INC., Heyburn, ID (US)

(72) Inventors: Christopher Hunsaker, Lehi, UT (US); Kendal Hunsaker, Saratoga Springs, UT (US); Daniel Piquet, Rupert, ID (US); Jay Srinivasan, Milpitas, CA (US); Daniel Bigelow, Underhill, VT (US); Brock Mitchell, Rupert, ID (US)

(73) Assignee: ACUITUS AG, INC., Heyburn, ID (US)

( * ) Notice: Subject to any disclaimer, the term of this patent is extended or adjusted under 35 U.S.C. 154(b) by 0 days.

(21) Appl. No.: 18/074,158

(22) Filed: Dec. 2, 2022

(65) Prior Publication Data

US 2023/0306338 A1 Sep. 28, 2023

Related U.S. Application Data

(63) Continuation of application No. 16/990,406, filed on Aug. 11, 2020, now Pat. No. 11,521,146, which is a
(Continued)

(51) Int. Cl.
*G06Q 10/0633* (2023.01)
*G06Q 10/0639* (2023.01)
(Continued)

(52) U.S. Cl.
CPC ..... *G06Q 10/0633* (2013.01); *G06Q 10/0639* (2013.01); *G06Q 50/02* (2013.01);
(Continued)

(58) Field of Classification Search
CPC .......... G06Q 10/0633; G06Q 10/0639; G06Q 50/02; G08G 1/202; G08G 1/205; H04W 4/029; H04W 4/44
See application file for complete search history.

(56) References Cited

U.S. PATENT DOCUMENTS 5,938,709 A  8/1999  Hale et al.
6,216,071 B1  4/2001  Motz
(Continued)

FOREIGN PATENT DOCUMENTS

CN  101149267 A  3/2008
CN  101197039 A  6/2008
(Continued)

OTHER PUBLICATIONS

Analysis of Traffic Patterns and Yield Monitor Data for Field Efficiency Determination R. D. Grisso, P. J. Jasa, D. E. Rolofson, Publ. Date: 2002.
(Continued)

*Primary Examiner* — Michael J Zanelli
(74) *Attorney, Agent, or Firm* — Workman Nydegger

(57) ABSTRACT

The present disclosure describes computer systems and computer-implemented methods for managing an agricultural operation. Vehicle location information for at least one agricultural vehicle is received, and the vehicle location information is used to determine a vehicle path. Vehicle state information is received from the vehicle and is used to determine whether the vehicle is in a working or non-working state. The vehicle path is then rendered on a map display, with the map display visually distinguishing between sections of the vehicle path traversed while the vehicle is in the working state and sections of the vehicle path traversed while the vehicle is in the non-working state.

10 Claims, 18 Drawing Sheets

Related U.S. Application Data continuation of application No. 16/017,637, filed on Jun. 25, 2018, now Pat. No. 10,776,733.

(60) Provisional application No. 62/524,898, filed on Jun. 26, 2017.

(51) Int. Cl.
    *G06Q 50/02*     (2012.01)
    *G08G 1/00*     (2006.01)
    *H04W 4/029*     (2018.01)
    *H04W 4/44*     (2018.01)

(52) U.S. Cl.
    CPC ............ *G08G 1/202* (2013.01); *G08G 1/205* (2013.01); *H04W 4/029* (2018.02); *H04W 4/44* (2018.02)

(56) References Cited

U.S. PATENT DOCUMENTS

| | | | |
|---|---|---|---|
| 7,397,392 | B2 | 7/2008 | Mahoney et al. |
| 9,235,334 | B2 | 1/2016 | Geis et al. |
| 10,303,175 | B2 * | 5/2019 | Sakaguchi ............ G05D 1/0219 |
| 10,776,733 | B2 | 9/2020 | Hunsaker et al. |
| 11,521,146 | B2 | 12/2022 | Hunsaker et al. |
| 2001/0016788 | A1 | 8/2001 | Hauwiller et al. |
| 2004/0193349 | A1 | 9/2004 | Flann et al. |
| 2007/0050116 | A1 | 3/2007 | Jernigan |
| 2009/0118904 | A1 | 5/2009 | Birnie |
| 2011/0213531 | A1 | 9/2011 | Farley et al. |
| 2011/0295460 | A1 | 12/2011 | Hunt et al. |
| 2014/0121882 | A1 | 5/2014 | Gilmore et al. |
| 2014/0310412 | A1 | 10/2014 | Shinohara et al. |
| 2015/0160655 | A1 | 6/2015 | Korthals et al. |
| 2015/0242799 | A1 | 8/2015 | Seki et al. |
| 2015/0243114 | A1 | 8/2015 | Tanabe et al. |
| 2016/0066505 | A1 | 3/2016 | Bakke et al. |
| 2016/0157275 | A1 | 6/2016 | Matthews |
| 2017/0041407 | A1 | 2/2017 | Wilbur et al. |
| 2017/0046639 | A1 | 2/2017 | Osborne et al. |
| 2020/0372422 | A1 | 11/2020 | Hunsaker et al. |

FOREIGN PATENT DOCUMENTS

| | | | |
|---|---|---|---|
| EP | 2197171 | A2 | 6/2010 |
| EP | 2529610 | A1 | 12/2012 |
| JP | 2015084667 | A * | 5/2015 |
| WO | 2011/104085 | A1 | 9/2011 |

OTHER PUBLICATIONS

Annex to the communication received for European Patent Application No. 18742674.7, dated Mar. 25, 2022, 4 pages.

International Search Report and Written Opinion for PCT/US2018/039419 dated Aug. 27, 2018.

International Search Report and Written Opinion issued in PCT/US2019/067788 dated Apr. 23, 2020.

Office Action received for European Patent Application No. 18742674.7, dated May 3, 2021, 5 pages.

Office Action received for Indian Patent Application No. 202017002760, dated Mar. 4, 2022, 7 pages.

Wang et al.; Research and Implementation of the Medical Logistics Vehicle Monitoring and Management; 2016 Intl. Conf, on Logistics, Informatics and Service Sciences (LISS); 2016; pp. 1-4 (Year: 2016).

* cited by examiner

900

```
┌─────────────────────────────────────────────────────────────┐
│ Receive Harvester Location Information For A Harvester, The │
│ Harvester Location Information Providing A Series Of        │── 902
│ Determined Geolocations Of The Harvester Within A Field     │
└─────────────────────────────────────────────────────────────┘
                              ▼
┌─────────────────────────────────────────────────────────────┐
│ Based On The Received Harvester Location Information,       │
│ Determine A Harvester Path Indicating A Path Traversed By   │── 904
│ The Harvester Over A Predetermined Time Period              │
└─────────────────────────────────────────────────────────────┘
                              ▼
┌─────────────────────────────────────────────────────────────┐
│ Receive Loading Truck Location Information For A Loading    │
│ Truck, The Loading Truck Location Information Providing A   │── 906
│ Series Of Determined Geolocations Of The Loading Truck      │
└─────────────────────────────────────────────────────────────┘
                              ▼
┌─────────────────────────────────────────────────────────────┐
│ Measure A Time Period For Which A Determined Geolocation    │
│ Of The Harvester And A Determined Geolocation Of The        │── 908
│ Loading Truck Are Within A Threshold Proximity To One       │
│ Another                                                     │
└─────────────────────────────────────────────────────────────┘
                              ▼
┌─────────────────────────────────────────────────────────────┐
│ Based On The Measured Time Period, Determine Whether A      │
│ Load Has Been Unloaded From The Harvester And Loaded Into   │── 910
│ A Loading Truck                                             │
└─────────────────────────────────────────────────────────────┘
                              ▼
┌─────────────────────────────────────────────────────────────┐
│ Based On One Or More Determinations That A Load Has Been    │
│ Unloaded From The Harvester, Divide The Harvester Path Into │
│ A Series Of Load Paths, Each Load Path Corresponding To A   │── 912
│ Respective Load Harvested By The Harvester, And Each Load   │
│ Path Therefore Indicating An Area In The Field From Which   │
│ The Respective Load Was Obtained                            │
└─────────────────────────────────────────────────────────────┘
                              ▼
┌─────────────────────────────────────────────────────────────┐
│ Render The Harvester Path On A Map Display, The Map Display │── 914
│ Indicating The Separate Load Paths Within The Harvester Path│
└─────────────────────────────────────────────────────────────┘
```

*FIG. 24*

COMPUTER PLATFORM FOR CONTROLLING AGRICULTURAL ASSETS

CROSS-REFERENCE TO RELATED APPLICATIONS

This application is a continuation of U.S. patent application Ser. No. 16/990,406, filed Aug. 11, 2020, which is a continuation of U.S. patent application Ser. No. 16/017,637, filed Jun. 25, 2018, which claims priority to and the benefit of U.S. Provisional Patent Application Ser. No. 62/524,898, filed on Jun. 26, 2017. Each of the foregoing is incorporated herein by reference in its entirety.

BACKGROUND

Agricultural productivity has increased in the modern era due to such advances as mechanization, better crop varieties, more effective fertilizer use, better irrigation practices, and pesticide and herbicide development. As farms become more productive and efficient, food prices may decrease and food supplies may become more stable. However, despite these advances, several inefficiencies remain in a typical farming process, and there is an ongoing need for improvements which increase production efficiency, increase crop quality, and/or decrease operational costs.

BRIEF DESCRIPTION OF THE DRAWINGS

In order to describe various features and concepts of the present disclosure, a more particular description of certain subject matter will be rendered by reference to specific embodiments which are illustrated in the appended drawings. Understanding that these figures depict just some example embodiments and are not to be considered to be limiting in scope, various embodiments will be described and explained with additional specificity and detail through the use of the accompanying drawings in which:

FIG. 24 is a flowchart of a method for rendering locations of harvested agricultural produce in an agricultural harvesting operation;

DETAILED DESCRIPTION

Introduction

The present disclosure relates to computer systems, computer-implemented methods, and computer hardware storage devices configured to provide a platform for managing agricultural operations and assets. The farming process often includes several operational inefficiencies, including a lack of coordination between different operators (such as between harvesters and loading trucks), difficulty in tracking where all vehicles and operators are at a given time, difficulty in determining whether a crew is on schedule for the particular operation, and difficulty in determining what changes could be made to meet time demands and/or increase operational efficiencies. These problems can have a real-world impact in terms of both production efficiency, overall production, and costs. For example, inefficient coordination of separate agricultural vehicles or inefficient utilization of available agricultural assets wastes fuel and operator time. Moreover, inefficient harvesting due to mismanagement of assets leads to suboptimal yields and/or a lower quality product. For example, harvesting too early removes the crop from the field and misses time for additional potential growth, but harvesting too late can lead to spoilage, frost damage, and/or other losses.

Such problems are further compounded by certain technological issues that are inherent to agricultural asset management technology. While tracking of a vehicle using GPS data is known, such basic tracking cannot accurately characterize tractor movements in a manner that enables accurate monitoring and rendering of operational progress. For example, not all detected tractor movements will necessarily correspond to actual work being performed. Moreover, inaccuracies inherent in the GPS vehicle location data can make it difficult or impossible to render vehicle path information in a way that usefully corresponds to actual tractor movement.

Embodiments described herein provide farm managers or other users with the ability to monitor the progress of an ongoing agricultural operation in real time, without requiring the user to travel to multiple work sites for visual inspection. Embodiments described herein also solve inherent technological problems which have impeded conventional approaches to accurately render agricultural operation progress. Embodiments described herein may therefore be utilized to increase the productivity and/or efficiency of monitoring and managing agricultural operations.

Computer System Overview

Figure 1:
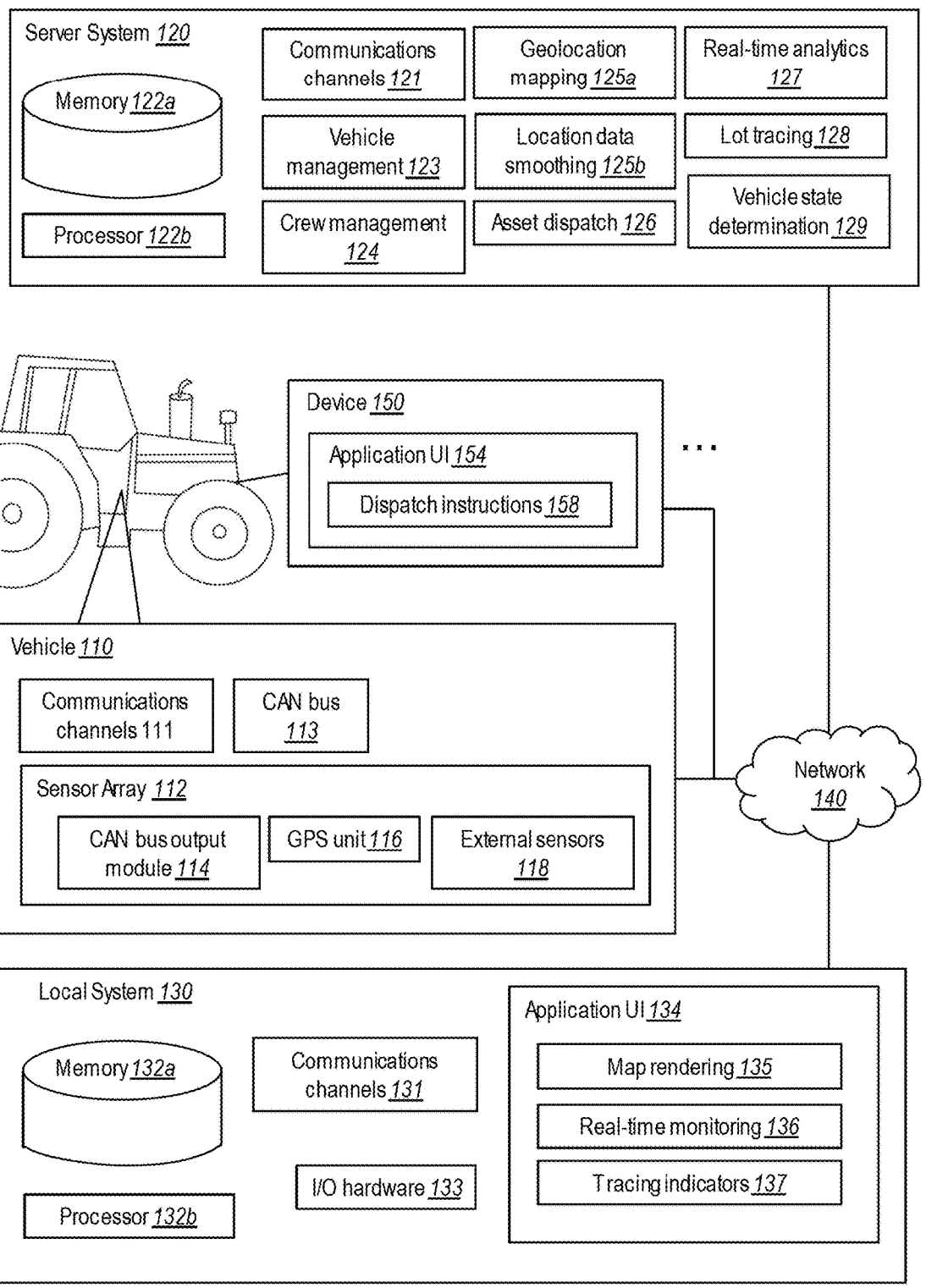
FIG. 1 illustrates an exemplary computing environment which may be utilized to provide an agricultural operation management platform.

FIG. 1 illustrates an exemplary computer system architecture for an agricultural operation control platform. The illustrated embodiment includes a vehicle 110, a server system 120, and a local system 130. The vehicle 110, server system 120, and local system 130 are connected by (or are part of) a network 140. The network 140 may communicatively couple the vehicle 110 to the server system 120 and/or local system 130 using one or more of a cellular network, Local Area Network ("LAN"), a Wide Area Network ("WAN"), or the Internet, for example.

The vehicle 110, server system 120, and local system 130 may be configured to communicate with each other through respective communications channels 111, 121, and 131. The communications channels 111, 121, and 131 include hardware and/or suitable application programming interfaces (APIs) that enable the respective systems to communicate and share data with one another and/or with other systems (including other systems within a distributed computing environment and/or other third-party systems).

The vehicle 110 is an agricultural vehicle such as a tractor, harvester (e.g., potato harvester, chopper/forage harvester, combine harvester), windrower, sprayer, loading truck, and the like. In some embodiments, the vehicle 110 includes one or more implements. For example, a tractor may be operatively coupled to a plow (e.g., moldboard plow, chisel plow), cultivator (e.g., disc, harrow, crumbler), leveler, loading wagon, planter, pull-behind harvester, and the like. One of skill in the art will understand that some operations may be accomplished using either a tractor coupled to an implement or using a vehicle tailored itself for a particular operation (e.g., a pull-behind forage harvester vs. a self-propelled forage harvester). It will therefore be understood that exemplary agricultural operations described herein may be accomplished using any vehicle or vehicle-implement combination suitable for the particular agricultural operation at hand, and unless specified otherwise, the term "vehicle" will be understood to mean an agricultural vehicle or vehicle-implement combination.

In addition, although a single vehicle 110 is shown here (for the sake of clarity), it will be understood that a typical implementation will include multiple vehicles, as indicated by the ellipses. Thus, where the description refers to a vehicle in the singular, it will be understood that the same description may be applied to other vehicles within a particular multi-vehicle implementation as well.

As shown, the vehicle 110 includes communications channels 111, a sensor array 112 and a controller area network (CAN bus 113). The communications channels 111 may include a cellular modem (e.g., configured for 3G or LTE network communications, or other suitable cellular communications) for communicating with the network 140 from remote agricultural operation locations.

The sensor array 112 includes one or more sensors configured for detecting a state of the vehicle. In the illustrated embodiment, the vehicle 110 includes a CAN bus output module 114 configured for receiving output from the CAN bus 113 and determining one or more vehicle states based on data received from the CAN bus 113. Data from the CAN bus 113 may include vehicle speed, vehicle engine speed, engine torque (e.g., provided as "percent torque required to overcome friction"), power take-off (PTO) status/engagement, hydraulic system state, etcetera.

The illustrated sensor array 112 also includes a global positioning system (GPS) unit 116 configured to detect the vehicle's geolocation. In preferred embodiments, the GPS unit 116 is configured as a relatively inexpensive GPS chip, such as those commonly utilized in mobile phone devices or micro GPS tracking chips. Examples include GPS chips configured to communicate using common cellular networks (e.g., 3G, LTE).

As shown, the vehicle 110 may also include one or more external sensors 118 operatively coupled to the vehicle 110 and/or associated implement. The external sensors 118 may include one or more proximity/position sensors, optical sensors, weight sensors (e.g., load cells, strain gauges, etc.), temperature sensors, moisture sensors, and/or other sensor configured for providing desired vehicle state information.

In some embodiments, for example, one or more suitable sensors may be utilized to determine the position of an attached implement, the weight within a loading wagon or truck, the temperature and/or moisture content of harvested product, etcetera.

In one example which may be utilized in a harvesting operation, one or more weight sensors are provided at a harvester to measure gross weight of harvested product as it is transferred from the harvester to a loading truck. This from-the-harvester weight information can be compared to later weight measurements to provide additional information such as net weight and/or percent waste. Weight information obtained at a storage location (e.g., following transport, cleaning, and/or sorting) may be compared to the earlier weight information to determine losses, to compare gross weights to net weights, and the like. The subsequent weight information may be obtained from a scale at the storage location and/or from one or more weight sensor associated with a piler or other such handling equipment utilized at the storage location, for example.

The sensor array 112 may be configured to connect to the server system 120 and send data at predetermined reporting intervals. The reporting interval may be configured to depend on the state of the vehicle 110. For example, when the vehicle is active/moving, the reporting interval may be relatively short (e.g., every few seconds), whereas when the vehicle is inactive (i.e., not moving), the reporting interval may be expanded (e.g., on the order of several minutes). When a connection to the server cannot be established (as may happen regularly in relatively remote agricultural operations), the sensor array 112 may be configured to cache collected data in local memory until a connection with the server 120 is made. Upon re-connecting, the locally cached data is uploaded to the server system 120.

A computer device 150 may also be associated with the vehicle 110. As described in more detail below, the computer device 150 may have an application with a user interface 154 for displaying dispatch instructions 158 to a vehicle operator. For example, dispatch instructions 158 may be provided to a loading truck directing the loading truck to a particular location in the field and/or directing the loading truck along a particular path to the field and/or between the field and a storage location. When directed to the field, the loading truck may then meet with the harvester by a directed path and/or at a directed location where loading can commence with minimal waiting and harvester downtime.

The computer device 150 may be an integral part of the other hardware components of the vehicle 110. However, in a typical implementation, the computer device 150 is a separate device (e.g., the vehicle operator's mobile phone) which includes an installed farm asset control application operable to provide the dispatch instructions on the mobile device.

In the illustrated embodiment, the server system 120 is configured to receive vehicle state data from the vehicle 110 and to communicate with the local system 130 in a server-based configuration. It will be understood that the particular computer system architecture illustrated in FIG. 1 represents only an example implementation. Other embodiments may divide the described memory, modules, components, and/or functions differently among the server system 120, local system 130, and optionally additional computer systems. In some embodiments, memory components and/or program modules are distributed across a plurality of constituent computer systems in a distributed environment. In other embodiments, memory components and program modules are included in a single integrated computer system. Accordingly, the systems and methods described herein are not intended to be limited based on the particular location at which components are located and/or at which functions are performed.

As shown, the server system 120 includes memory 122a and at least one processor 122b, and the local system 130 includes memory 132a and at least one processor 132b. Each of memory 122a and 132a may independently be physical system memory, which may be volatile, non-volatile, or some combination of the two. The term "memory" may also be used herein to refer to non-volatile mass storage such as physical storage media.

The illustrated server system 120 includes a vehicle management module 123 configured to register vehicles and associated vehicle information. For example, each vehicle may be registered with data related to vehicle type, vehicle capacity, implement type (if an implement is utilized in the particular vehicle setup), implement size, and the like. The server system 120 also includes a crew management module 124 configured for registering workers, assigning workers to particular vehicles, and/or grouping sets of vehicles into separate crews.

The server system 120 also includes a geolocation mapping module 125a configured to map the location of registered vehicles. The geolocation mapping module 125a may include geo-fencing operations for defining particular farm and/or field boundaries. The geolocation mapping module 125a operates to associate GPS data received from the registered vehicles with map data in order to provide the location of each vehicle on the map. In some embodiments, the geolocation mapping module 125a determines a path through which the vehicle has travelled. As explained in more detail below, the path information may then be utilized to determine the portion of a farm/field that has been traversed and actually worked by the particular vehicle.

The server system 120 also includes a location data smoothing module 125b. the location data smoothing module 125b is configured to provide smoothing of vehicle location data in order to enable the generation of accurate vehicle path information. As explained in more detail below, imprecise GPS readings from the vehicle can lead to "flutter" or "drift" in the detected location of a vehicle, which can make it difficult to determine the path traversed by the vehicle and the corresponding areas of the field which have actually been worked. The location data smoothing module 125b functions to smooth the location data through a tiling operation to enable the generation of usable vehicle path information.

The illustrated server system 120 also includes an asset dispatch module 126 configured to provide dispatch information to one or more vehicles. For example, in a typical harvesting operation, a harvester working a field will offload harvested produce to loading trucks, which then transport the harvested produce from the field to a storage location. The asset dispatch module 126 may operate to coordinate harvester and loading truck movement so as to minimize harvester downtime. Based on determined factors such as harvester capacity, harvester path, average harvester speed, and/or field geometry, the asset dispatch module 126 may deliver dispatch instructions to the loading truck directing the loading truck to a particular location in the field. The loading truck may then meet with the harvester at a location where loading can commence with minimal waiting and harvester downtime.

Dispatch instructions may include directions including the field a truck should travel to, a location in the field where the loading truck should travel, a particular path/route the loading truck should take to reach the field and/or to reach the harvester within the field, and/or particular gates/entry points of the field to use, for example. Where multiple harvesters are being utilized, the asset dispatch module 126 may also function to direct the loading truck to a particular harvester among the multiple harvesters. Dispatch instructions may likewise be configured for directing a truck to a particular unloading site, a particular section of the unloading site, and/or particular path/route the truck should take to get to the unloading site.

The server system 120 also includes a real-time analytics module 127 configured to receive vehicle data, mapping data, and user-specified data to determine progress information and operation estimates. As explained in more detail below, a user may input information such as expected operating hours for each vehicle and/or crew, total acres to work, estimated vehicle utilization efficiency, and expected weather downtime. The real-time analytics module 127 may then determine progress based on received vehicle path information. The progress at a particular time may be compared to the original estimates.

The server system 120 also includes a lot tracing module 128 configured to enable the tracing of harvested product at a particular location within storage to a particular location in the field. Harvester path information indicating field position of a particular load may be correlated to the loading truck the product is loaded into which may also be correlated to the location of the load at the storage facility after delivery. Where spoilage, contamination, or other issues are determined at a particular location at the storage facility, the location or section in the field where the product at issue was harvested may be determined. In addition, the particular harvester, loading truck, and/or associated operators used for the particular load may be determined.

Traceability may enable more rapid detection of issues by pinpointing potentially problematic sections of the field, problematic equipment, and/or problematic operator(s). Traceability may also limit liability and/or limit wasting of harvested product. For example, where an issue is detected at the storage facility, disposal or other remedial actions may be focused on product from a particular section of field, from a particular harvester, and/or harvested at a particular time, for example. In contrast, where tracing is not utilized, remedial action may need to encompass a much larger scope and may result in disposal of more product than necessary, greater equipment downtimes, and/or other undesirable outcomes.

The server system 120 also includes a vehicle state determination module 129 configured to determine whether the vehicle 110 is in a "working" state or a "non-working" state. As explained in greater detail below, when the vehicle 110 is detected as being in a working state, any ground covered by the path of the vehicle 110 is considered to have been worked (e.g., tilled, planted, cultivated, harvested as the case may be). In contrast, when the vehicle 110 is detected as being in a non-working state, any ground covered by the path of the vehicle 110 will not be considered to have been worked. Accurately determining when vehicle movements correspond to actual work in the field enables the tracking and rendering of equipment utilization and work progress.

As an example, the vehicle 110 may include a tractor and an in-ground plow implement. In this example, the vehicle state determination module 129 operates to determine when the plow is being actively used to plow the ground. Not all detected movements of the tractor will necessarily correspond to actual plowing along the tractor path. For example, the plow will often be lifted out of the ground while the tractor turns, moves to and from the field, or moves to another location within the field. By determining whether the plow is actually being pulled through the ground as the tractor moves along the detected vehicle path, the vehicle state detection module 129 provides for accurate tracking and rendering of work progress for the farm and/or field.

As shown, the local system 130 may include input/output hardware 133. The input/output hardware may include, for example, one or more touch screens, keyboards, mouse controls, microphones, speakers, headphone connection components (wired or wireless), display screens, track balls, etc., to enable the receiving of information from a user and for displaying or otherwise communicating information to a user. In some embodiments, the local system 130 is a mobile device having a touch screen interface, though any suitable computer device(s) may be utilized.

In the illustrated embodiment, the local system 130 includes a farm asset control application enabling the manager/user to establish, view, manage, and control one or more farm plans/operations. As shown, the local system 130 includes an application user interface 134. The user interface 134 may include a map rendering component 135 for displaying vehicle locations, vehicle paths, and areas of the farm which have been worked. The user interface 134 may include a real-time monitoring component 136 for displaying work progress and equipment utilization and for receiving farm plan information and other input from the manager/user. The user interface 134 may also provide tracing indicators 137 for mapping storage location information to particular field sections.

The server system 120 and/or local system 130 may also be configured to receive responsive feedback to improve operational functionality of the system over time. For example, user feedback obtained as the user interacts with one or more user interfaces (such as those described below) may be received to improve the accuracy of the real-time analytics module 127, vehicle state determination module 129, and/or other modules described herein.

In one example, user input indicating when a vehicle is in a working state as opposed to a non-working state can be compared to determinations made by the vehicle state determination module 129. Determined correlations may then be mapped so that the system can "learn" to better detect vehicle state in the future with less need for manual input or correction. Such adaptive operation may be provided using one or more machine learning algorithms known in the art. In some embodiments, the server system 120 initially associates a default or generic profile to the local system 130 for determining vehicle state and/or other parameters. Subsequently, received feedback and/or historical data allows the particular profile to be more fine-tuned to a particular user's particular profile.

User Interfaces

FIGS. 2 through 17 illustrate exemplary embodiments of user interfaces for presenting farm asset control content. The user interfaces may be displayed as part of the application user interface 134 and/or application user interface 154 described in relation to FIG. 1, for example. Although many of the exemplary user interface displays shown in the Figures are directed to a tillage farming operation, it will be understood that the same principles may be applied for user interfaces related to other farming operations (planting, cultivating, harvesting, etc.).

Figure 3:
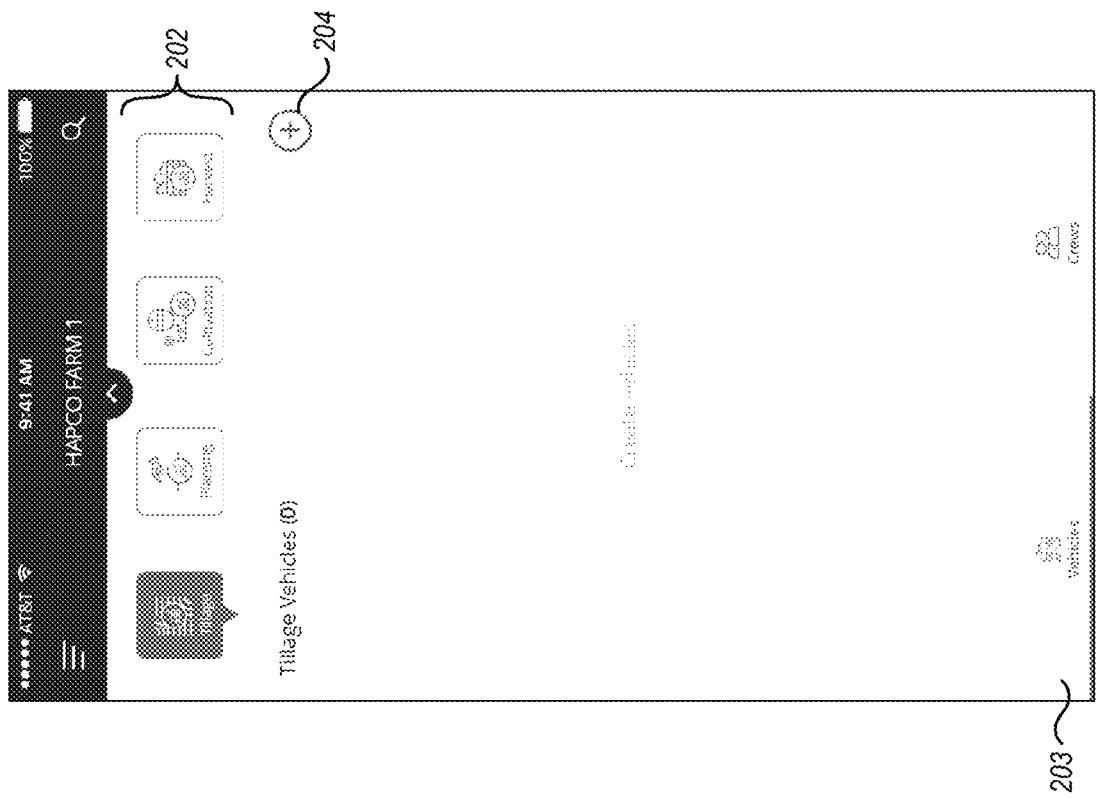
FIGS. 2 through 17 illustrate exemplary user interfaces for receiving user input, presenting content, and rendering output as part of the agricultural operation management platform.
Figure 2:
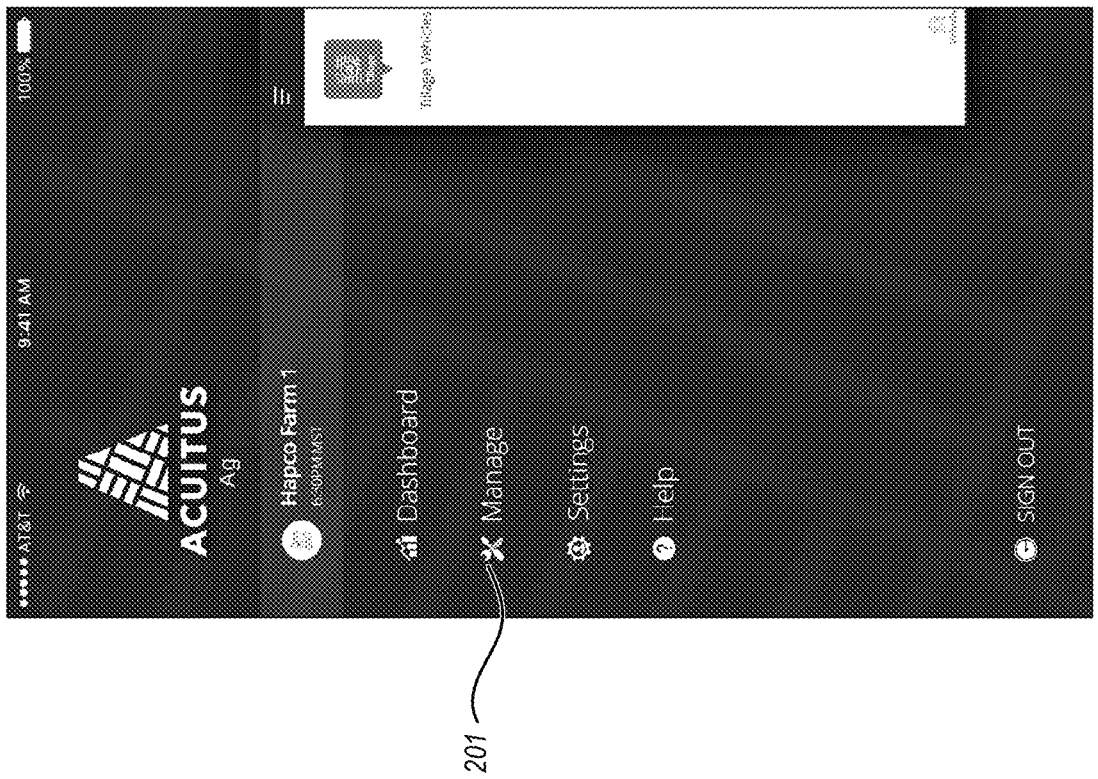

FIG. 2 shows a landing screen that may be presented to a user who has registered "Hapco Farm 1" for monitoring within the application. As shown, the landing screen may include a number of user-selectable objects for navigating to other interface displays and/or for providing additional application functionality. FIG. 3 illustrates an interface display which may be presented to the user upon selection of the "Manage" item 201 of the display of FIG. 2. The interface includes selectable objects 202 relating to different farm plans/operations. In the illustrated embodiment, the interface includes an object for tilling, planting, cultivating, and harvesting. Other embodiments may include other combinations of farming operations. The interface may also include a toggle or other selectable object (not shown) for activating and deactivating a plan. As shown, the interface may also include objects for adding or managing vehicles and/or crews for a particular selected farm operation. In the configuration shown in FIG. 3, the "vehicles" option 203 is selected, and a user is able to add vehicles to the selected tillage operation by selecting the "+" object 204.

Figure 5:
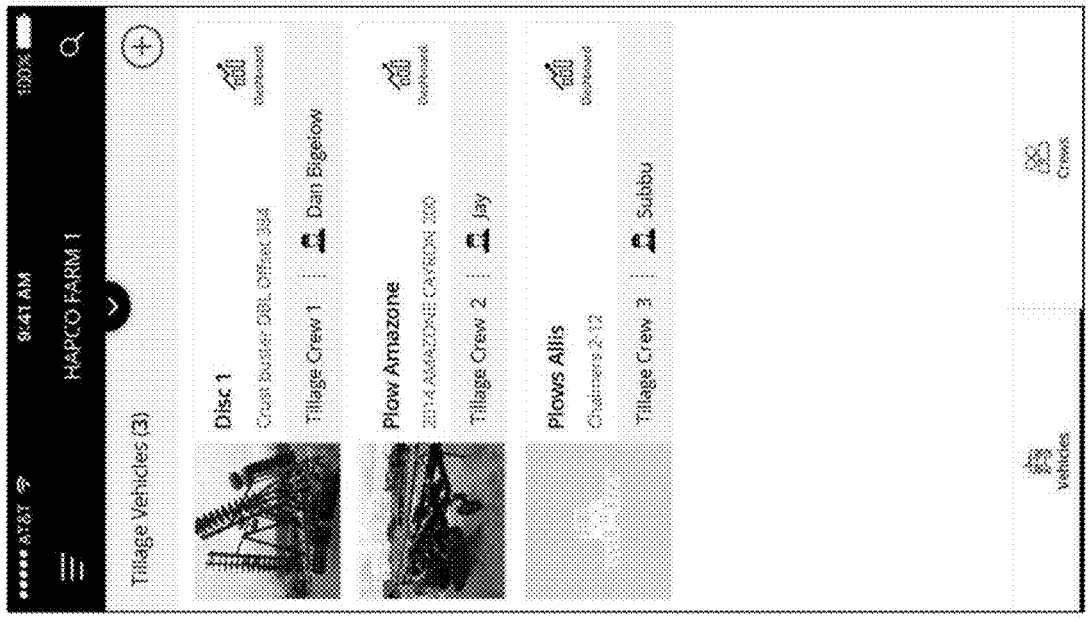
Figure 4:
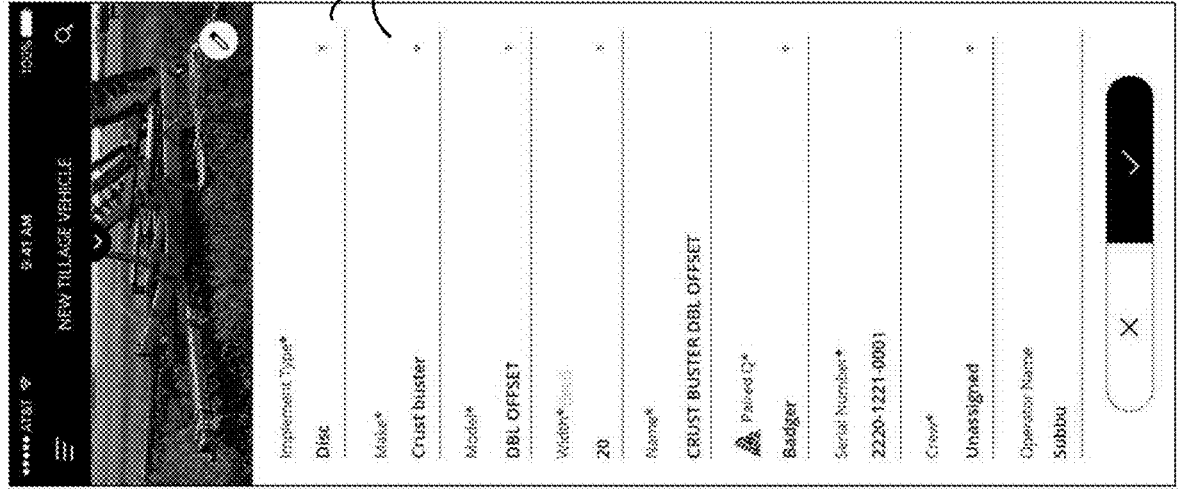

FIG. 4 shows a display resulting from selection of the "+" object 204 enabling a user to enter and add a vehicle to the selected operation. The interface includes input objects 205 where the user may manually input vehicle information such as vehicle or implement type, make, model, dimensions (e.g., width, number of rows, and/or other measurement appropriate to the particular vehicle), associated vehicle hardware device(s), identification information (e.g., serial number), assigned crew, assigned operator, and vehicle photograph. In some embodiments, in addition to or in the alternative to manual vehicle information entry, stored vehicle information may be used to auto-fill one or more of the objects upon user selection of the vehicle make and model. One or more of the input objects 205 may include a drop-down menu, radio button selection menu, or other such menu as an alternative to a free entry configuration. FIG. 5 shows an interface displaying the vehicles which have been registered for the selected tillage operation.

Figure 7:
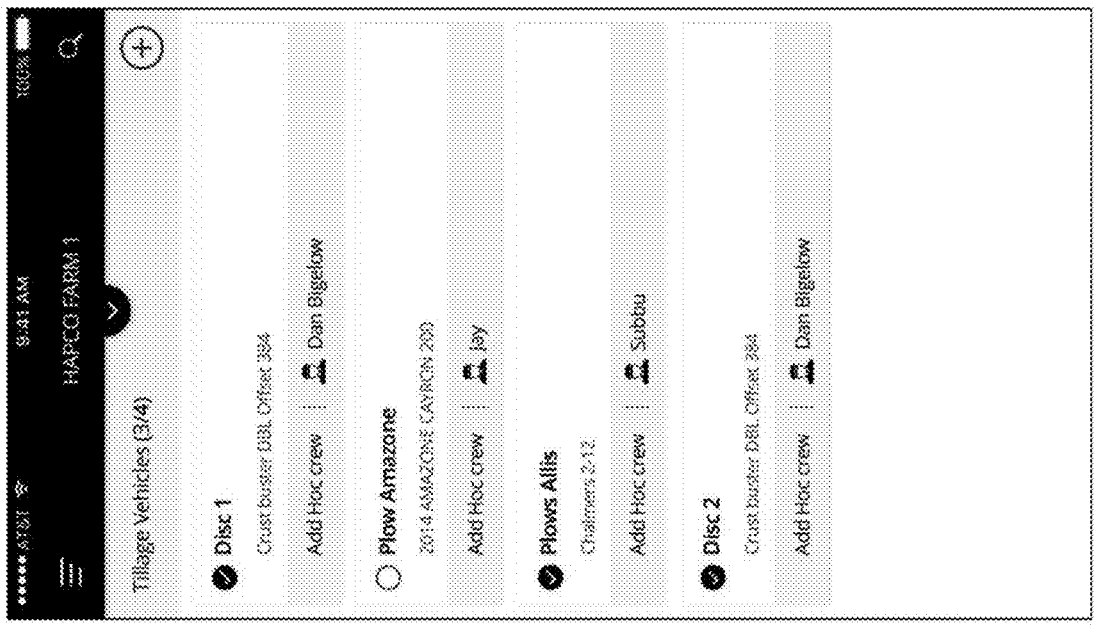
Figure 6:
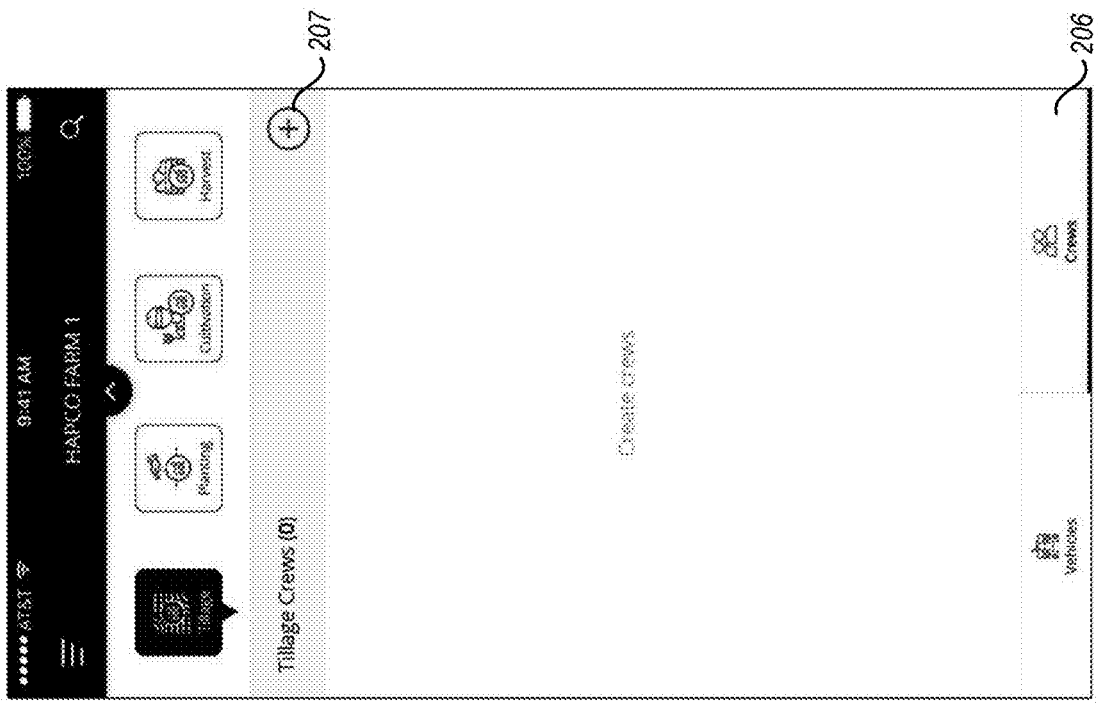
Figure 8:
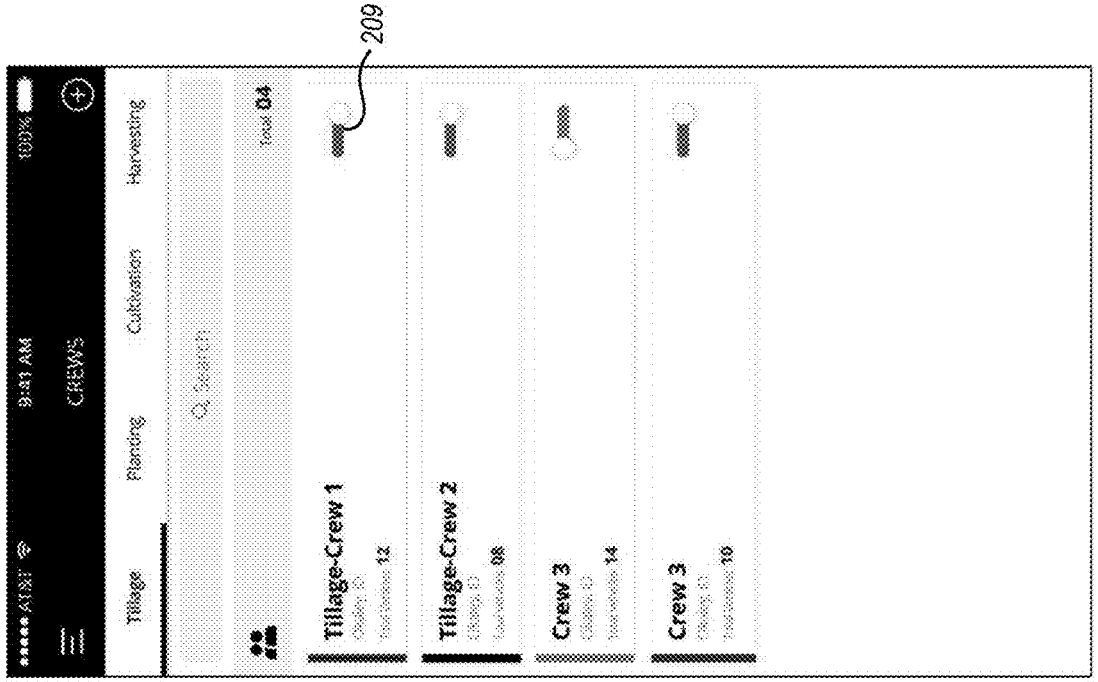

FIG. 6 shows an interface that may be utilized to add crews to the selected tillage operation. The interface of FIG. 6 is similar to the interface of FIG. 3, but with the "crews" object 206 selected rather than the "vehicles" object 203. The user may add crews by selecting the "+" object 207. Upon selection of the "+" object 207, the resulting display enables a user to select the registered vehicles to be assigned to the crew, as shown in FIG. 7. FIG. 8 illustrates an interface enabling the user to input details relating to the planned operation for the newly created crew via input objects 208. The details may include the area the crew is planned to work, the planned utilization percentage of the crew, planned working speed, planned working hours per day, and planned weather buffer, for example.

In the illustrated embodiment, the "planned area" represents the area the crew is expected to work for the selected farm operation (tillage in this example). The "planned utilization" is a measure, for a given period of time, of the time the vehicles and/or implements are working ground that has not yet been worked. Activities such as stops, idling, and lifting an implement to move to a new location will decrease the utilization score. The total time period (the denominator in the utilization calculation) may be a selected day, a selected week, the total time period of the operation, or a custom date range, for example. The "planned average working speed" is the speed the vehicles are expected to operate at when in a working state. The "planned working hours" is the number of hours per day the crew is planned to be actively operating the associated vehicles. The "weather buffer" is the percentage of time that weather is expected to disrupt normal crew work during the operation period.

Figure 9:
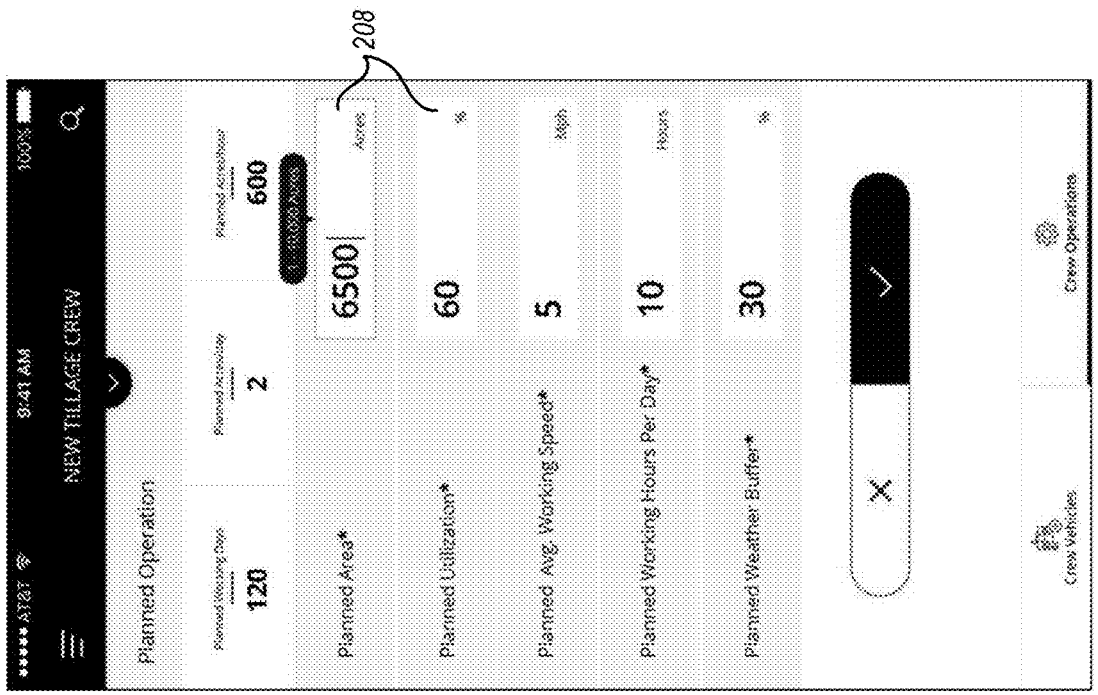

The application may operate to determine capacities of one or more registered vehicles. For example, the capacity of a vehicle may be determined as the width of the vehicle (e.g., as received using the interface shown in FIG. 4) multiplied by the average working speed (e.g., as received using the interface shown in FIG. 8), to give a capacity score in area per time. Typically, determined vehicle capacities will also account for the expected working hours per day to display vehicle capacity in the units of acres per day. Capacity may also be defined in units of mass over time where appropriate, such as with a harvesting operation. When vehicles are added to a crew, the capacities of each vehicle may be summed to determine a crew capacity. The crew capacity defines the expected area to be worked per hour and per day, and is used to estimate the total days needed to work the planned area. FIG. 9 illustrates an interface displaying created crews. As shown, the crews may be selectively activated and deactivated through manipulation of a toggle 209 or other such object.

Figure 10:
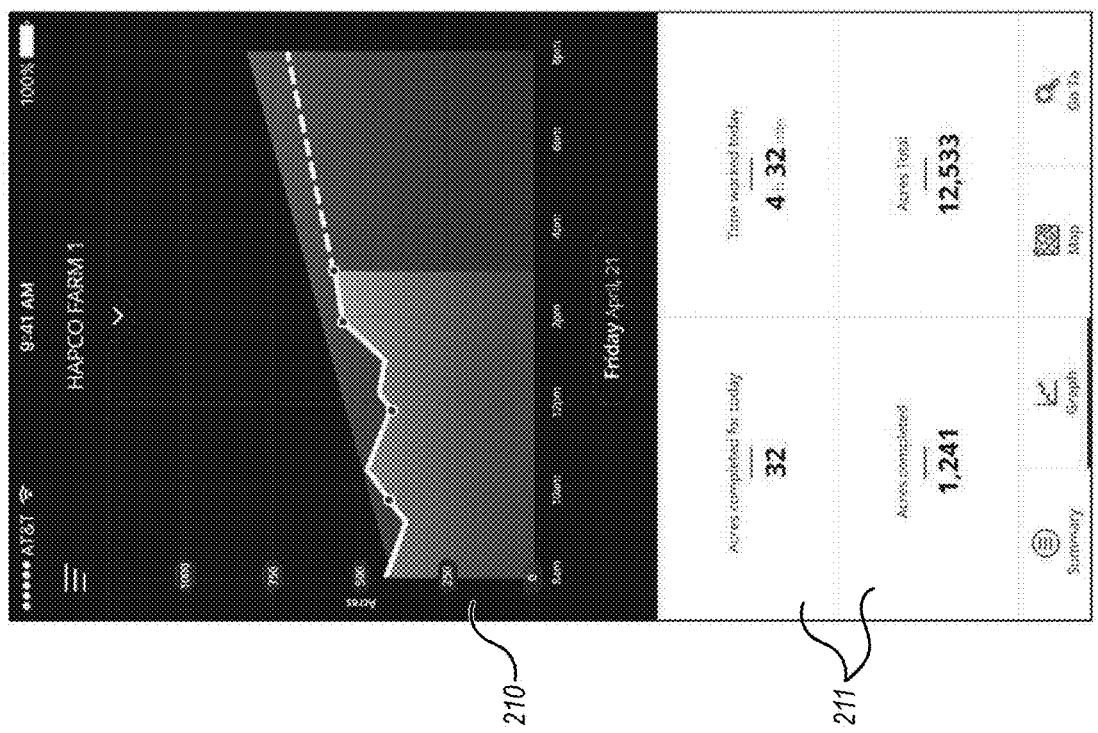

FIG. 10 illustrates a dashboard interface for displaying utilization and operation progress information. As shown, the interface may include a graphical display 210 showing operation progress for a selected time period and optionally comparing the operation progress to the planned progress. In the illustrated interface, the graph shows acres completed on the vertical axis and time on the horizontal axis. The time period is selected as the current workday ("Friday April 21"). The planned progress is displayed as the shaded background of the graph, while the line represents actual progress to present. In the example shown, the actual progress is slightly behind the planned progress. An extrapolation showing expected future performance (based on the progress so far) may also be displayed, and is shown here as the dashed line extending from the actual progress to date line. The interface may also include other informative display objects 211, such as information for a selected time period (e.g., current day, current week, custom date range) including acres completed for the selected time period and time worked during the selected time period, total operation acres completed to date, and total acres within the plan, for example.

The dashboard display shown in FIG. 10 is shown at the level of the entire farm ("Hapco Farm 1"). Similar dashboard interfaces may be displayed at more granular levels by selecting particular crews or vehicles. For example, if a particular crew dashboard is selected, the display objects will relate to crew-specific progress, such as actual work completed by the selected crew compared to planned work to be completed by the selected crew.

Figure 11:
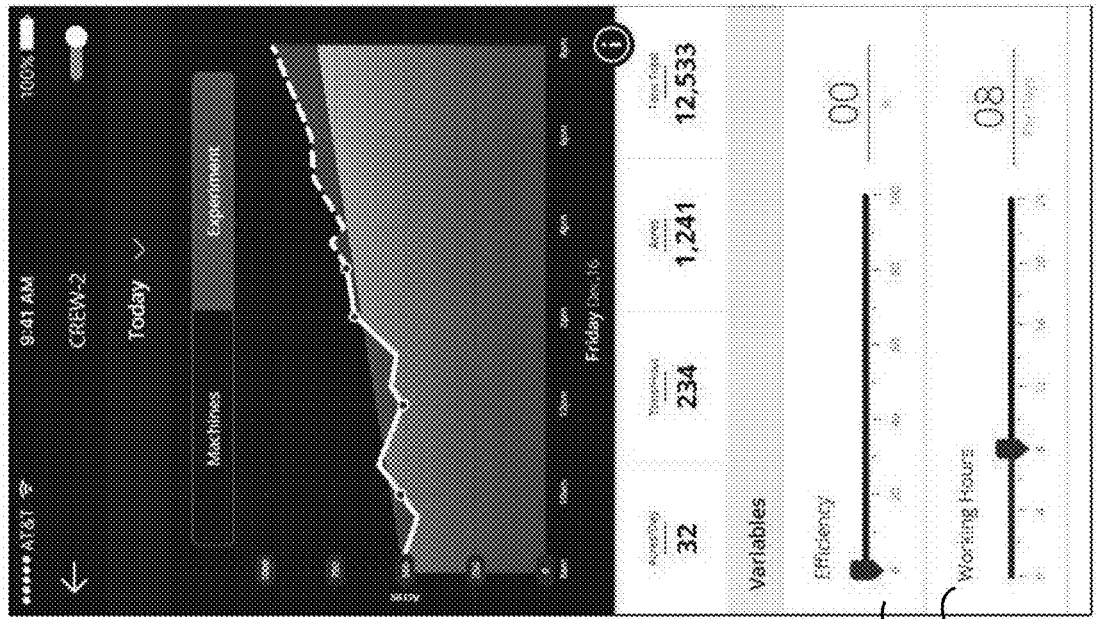

FIG. 11 illustrates an interface providing experimental plan interactivity. As shown, the interface may display one or more operation variables along with manipulatable controls 212 allowing the user to adjust the variables. As the user adjusts the variables, the expected progress is displayed by the graph (shown here as the extrapolated red dashed line). Manipulatable variables may include efficiency/utilization (i.e., the percentage of working hours in which the vehicle(s) is/are providing actual tilling, cultivating, harvesting, etc.), active crew working hours per day, average vehicle speed, and/or other operation variables that can impact operation progress.

In some embodiments, the application may provide suggestions and/or notifications to the user. For example, if it appears that the farm (or a particular crew or a particular vehicle) is behind schedule, the application can calculate what changes to utilization percentage, average vehicle speed, vehicle configurations between crews, and/or working hours per day would likely bring the operation back to the planned schedule.

Although the foregoing embodiment illustrates one exemplary way to display progress information, it will be understood that progress information may be additionally or alternatively displayed in a variety of other formats. For example, progress data may be presented in tabulated form, as a bar graph, pie chart, or other such data display format. In some embodiments, progress data is displayed in a manner that relates planned working hours, planned hours utilized, actual hours worked, and actual hours utilized.

Figure 12:
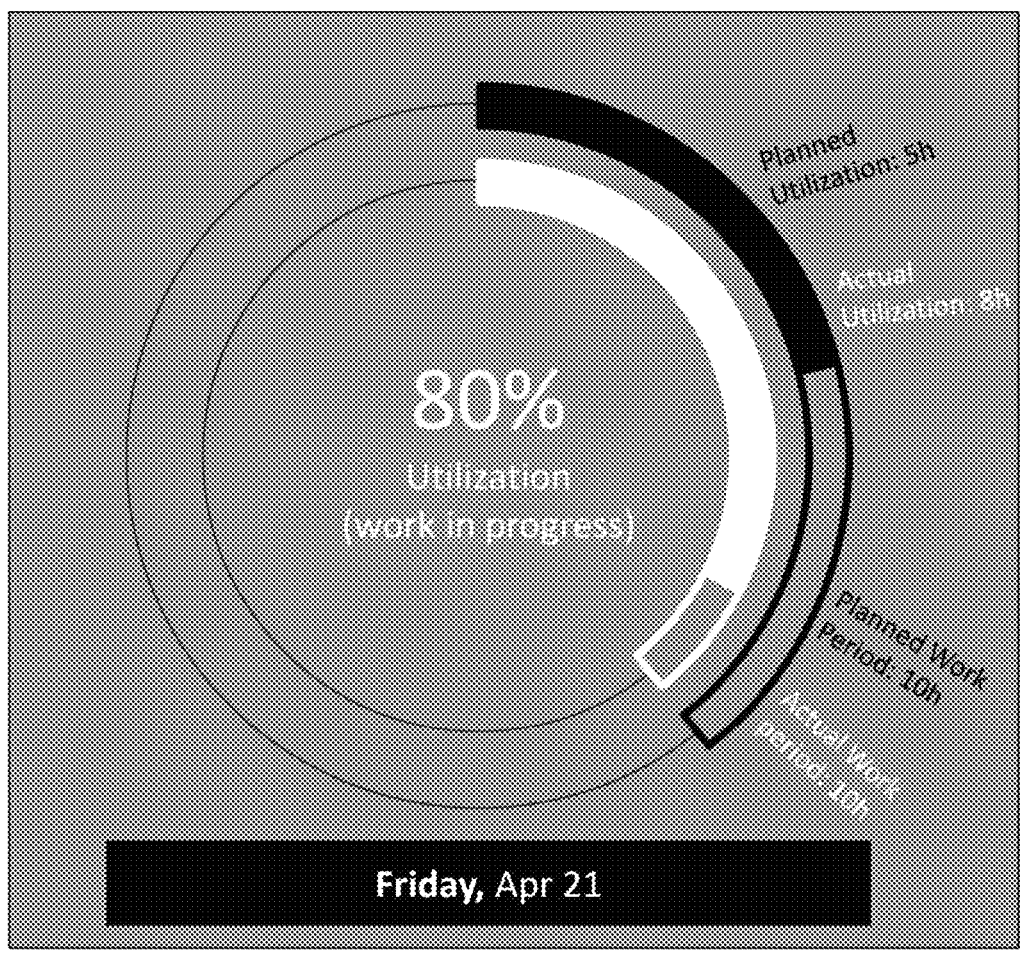

FIG. 12 illustrates an exemplary graphical display that integrates this information in the form of a donut graph. The graphical display allows the user to visualize equipment utilization ("actual utilization") as a proportion of the work period ("actual work period") and compare the actual results to planned results ("planned work period" and "planned utilization"). In the illustrated display, the time period is selected as a particular day ("Friday, Apr 21"), but may be selected as a week, total expected operation time period, or other custom time period. The full 360° of the donut graph represents the total available time for the selected time period (e.g., 24 hours for a selected day). In the illustrated display, the planned work period (outer bar) has been selected as 10 hours per day, and the actual work period (inner bar) met the 10 hour plan. The equipment utilization within the 10 hour work day was planned to be 5 hours for 50% utilization (see the filled in portion of the bar relative to the total length of the bar), but the actual utilization outperformed the plan with 8 hours of vehicle operation within the active working state at 80% utilization.

Figure 13:
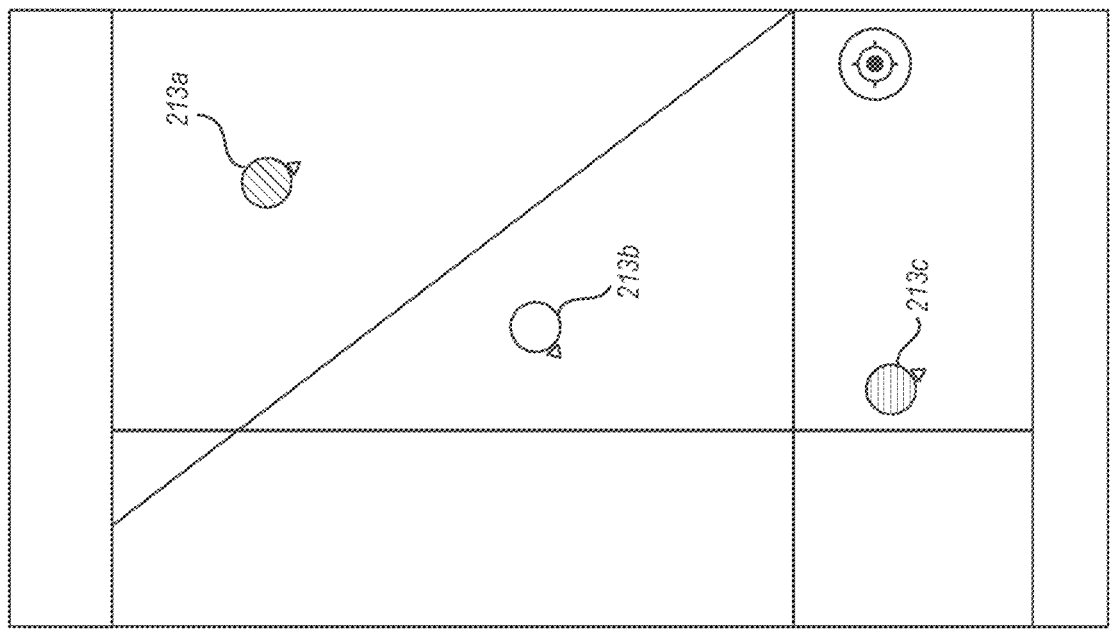

FIG. 13 illustrates a map interface displaying the locations of the vehicles of a selected farm. As shown, vehicle icons 213 (213a, 213b, and 213c) may be shaded, color-coded, or otherwise differentially displayed according to status. For example, vehicles at 85% completion of expected acreage may be colored green, vehicles at 70% to 85% completion of expected acreage may be colored yellow, and vehicles at less than 70% completion of expected acreage may be colored red, or some other distinguishing visual characteristic (shading, highlighting, flashing speed) may be adjusted accordingly. Other threshold values may also be utilized. Vehicles belonging to non-active crews may be grayed out, crossed out, or otherwise visually distinguished from vehicles of active crews. The illustrated interface is shown at the farm level. The interface allows the user to select for map displays at the crew and/or vehicle level as well.

Figure 14:
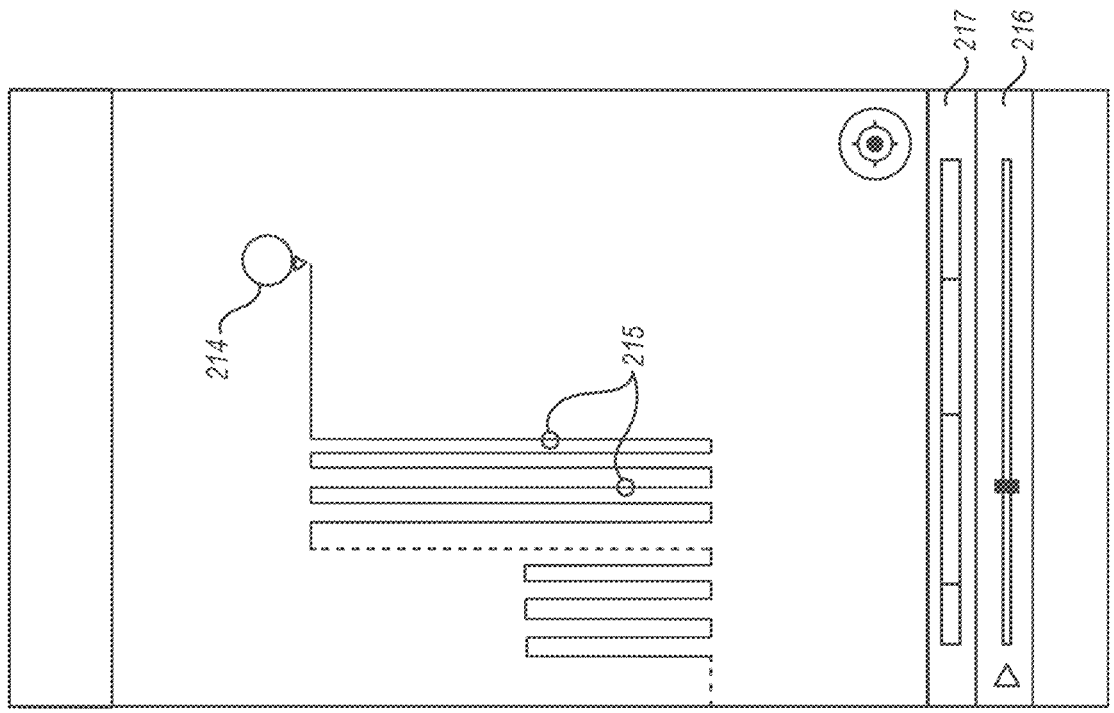

FIG. 14 shows a map interface at the vehicle level for a vehicle 214. As shown, vehicle path information may be rendered along with current vehicle location. For example, vehicle path information may be shown as a highlighted overlay on a map. The path information may be rendered in a manner that distinguishes between vehicle paths traversed while the vehicle is in an active working state and paths traversed while the vehicle is not working. For example, the illustrated interface shows working state paths with a solid line/shading while non-working paths between fields or field sections are shown as being non-solid/dashed.

Path information may additionally or alternatively be rendered to show where work was accomplished at particular time periods, such as by highlighting or otherwise distinguishing areas worked during one time period differently than areas worked during prior and/or subsequent time periods. The map interface may also include replay functionality, such as through manipulation of playback object 216, enabling the user to visualize locations a particular vehicle may have been at a particular time in the past, areas worked by the vehicle in the past, and/or path history a particular vehicle may have made over a particular period of time in the past.

Path information for the vehicle 214 may also be rendered within the histogram object 217. The histogram object 217 is a timeline that shows vehicle state changes over time. For example, the histogram object 217 may visually distinguish between time periods where the vehicle 214 was in a non-working state (e.g., by the non-shaded portions of the histogram object 217) from the time periods where the vehicle 214 was in a working state (e.g., by the shaded portions of the histogram object 217).

Figure 15:
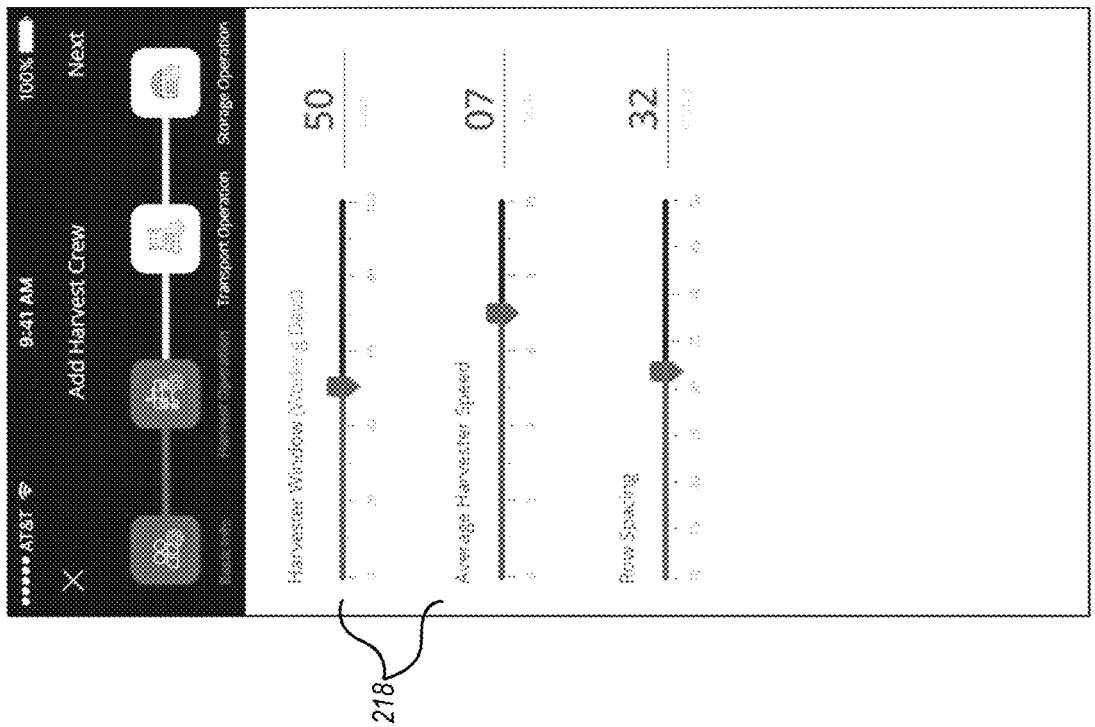

The map interface such as shown in FIG. 15 may also include one or more operational markers 215 indicating an operational event that occurred at that particular location on the map. In some embodiments, corresponding operational markers may also be indicated on the histogram 217, playback object 216, or other timeline display. The operational markers 215 may indicate an operational event such as a vehicle setting change, an operator shift change, an equipment repair or maintenance event, or the like. In one particular example, the operational markers 215 indicate the location of a load transfer between a harvester vehicle and a transport vehicle. An operational marker 215 may be selected to display associated operational event information. For example, in the case of a load transfer event, user selection of the operational marker 215 may cause the application to display associated information about the load that was transferred at that location. Such load information may include, for example, the time period of the load (e.g., start time and unload time), the distance driven by the harvester while in a working state to fill with the load, the non-working distance driven by the harvester during filling of the load, the load number (with respect to one or more of the farm, crew, harvester, loading truck, operator), and the like.

Figure 16:
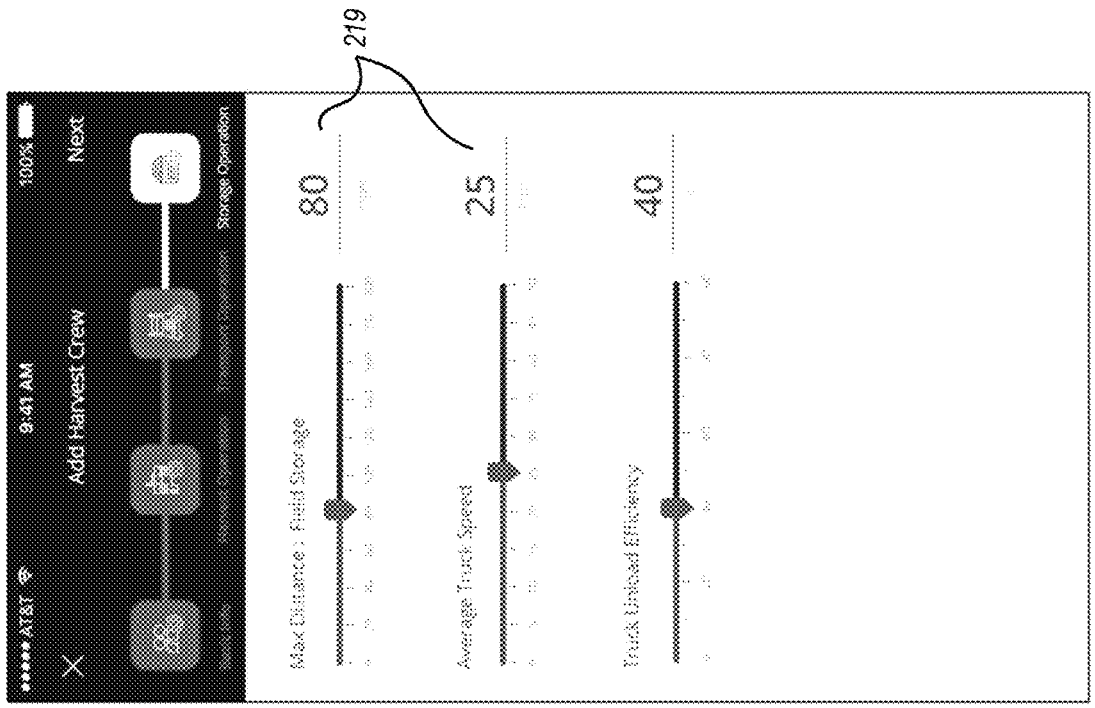
Figure 17:
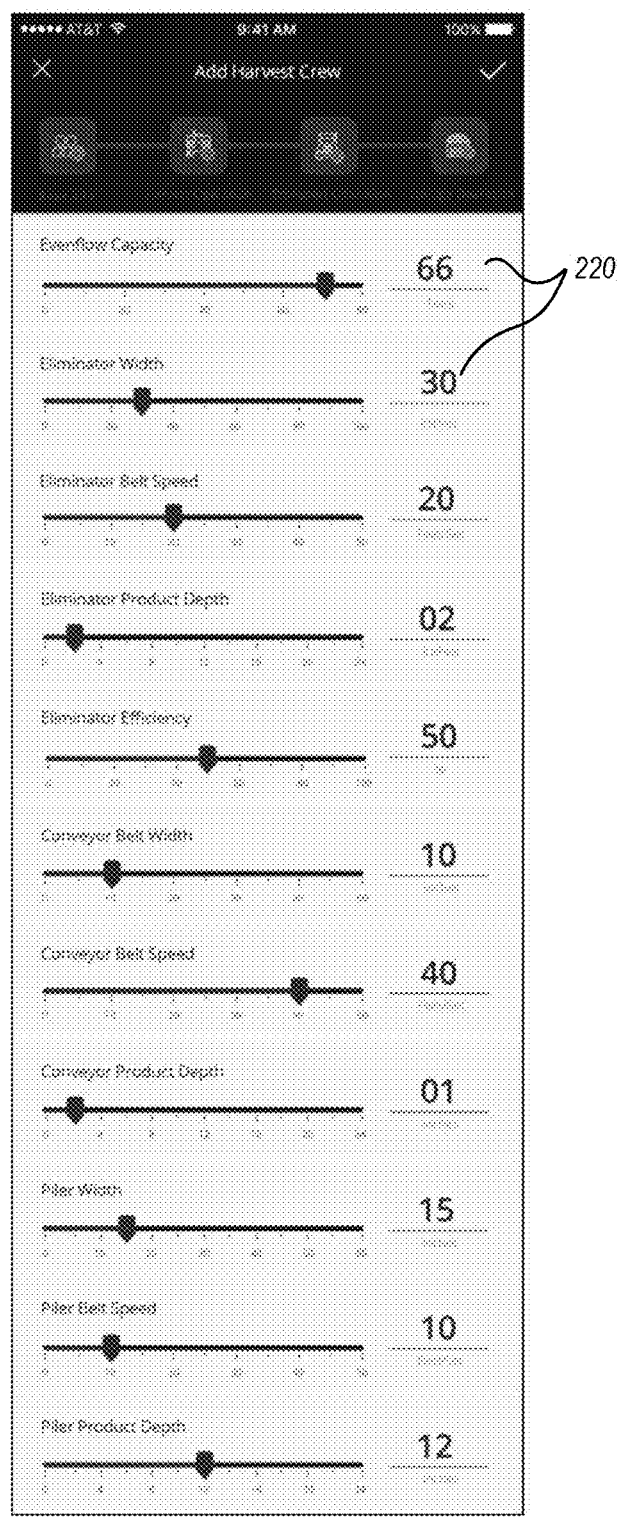

FIGS. 15 through 17 illustrate interface displays associated with a harvesting operation. As described above, elements of the foregoing interface displays may be utilized in other operations and are not limited to a tilling operation. In some circumstances, a harvesting operation may be more complex, as it typically involves managing in-field activities (harvester activity, harvester and loading truck interactions), storage location activities (loading truck unloading), and transport activities between the field and the storage location.

FIG. 15 illustrates an interface allowing the user to input harvester information, via input objects 218, including information such as harvesting window, average harvester speed, and row spacing, for example. FIG. 16 illustrates an interface allowing the user to input transport information, via input objects 219, such as distance between field and storage location, average truck speed, and truck unloading efficiency, for example. FIG. 17 illustrates an interface allowing the user to input various inputs relating to the storage location via input objects 220. The interfaces of FIGS. 15 through 17 illustrate a potato harvesting operation. Other harvesting operations may be related to other products (e.g., other vegetables, alfalfa, wheat, barley, oats), and it will be understood that particular relevant inputs may change depending on the particular type of harvesting operation.

Vehicle State Determination

Figure 18:
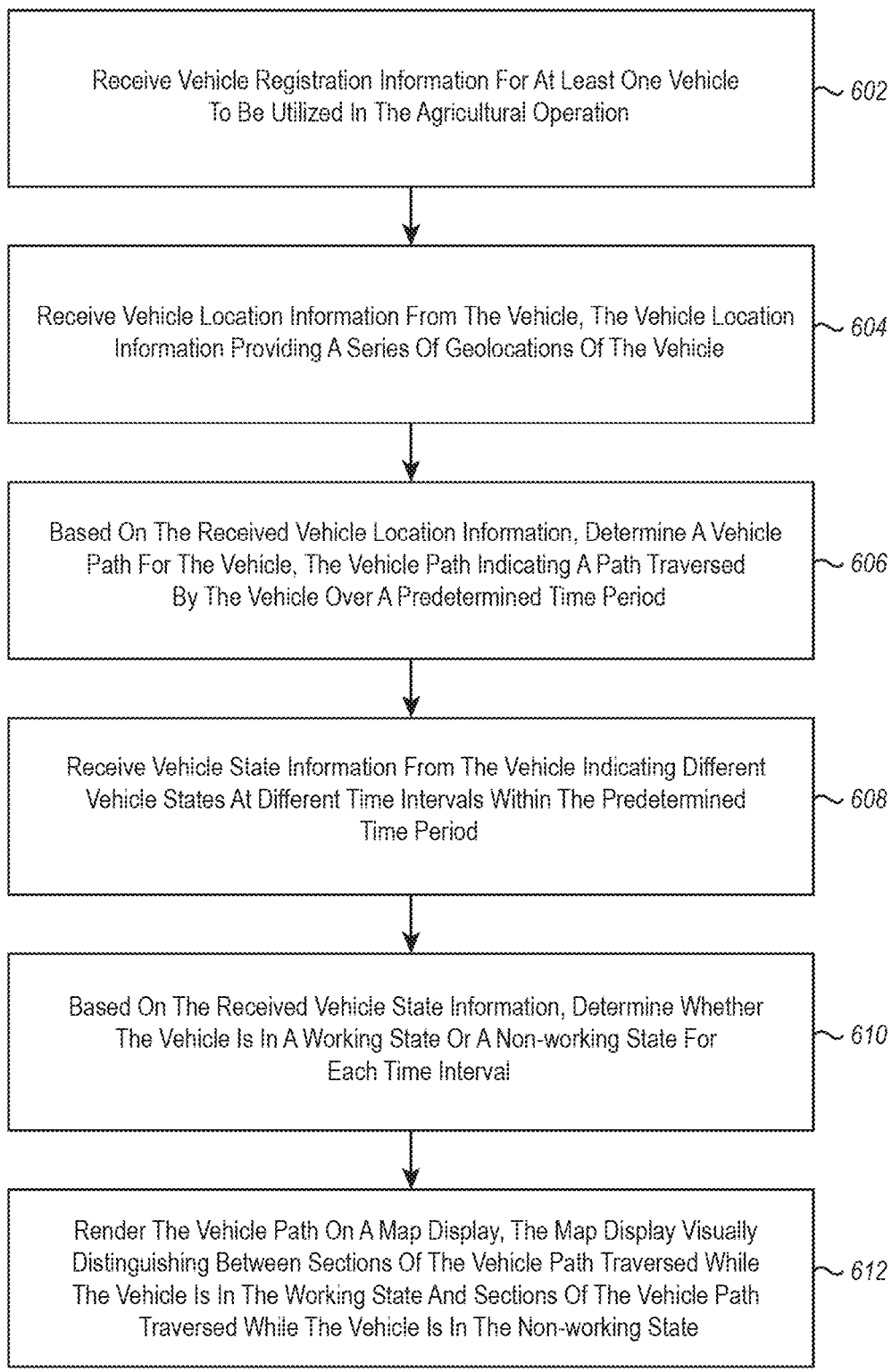
FIG. 18 is a flowchart of a method for tracking the location of an agricultural vehicle and rendering a path traversed by the agricultural vehicle according to operational status of the vehicle over time.

FIG. 18 is a flowchart of a method 600 for tracking the location of an agricultural vehicle and rendering a path traversed by the agricultural vehicle according to operational status of the vehicle over time. The method 600 may be implemented on and performed by a computer system such as the system 100 illustrated in FIG. 1. The associated information may also be rendered and displayed using one or more of the interfaces shown in FIGS. 2 through 17, and in particular the interfaces shown in FIGS. 13 and 14.

The method includes the step of receiving vehicle registration information for at least one vehicle to be utilized in the agricultural operation (step 602). This could be accomplished, for example, through the use of an interface such as shown in FIGS. 3 through 5. The method also includes the step of receiving vehicle location information from the vehicle, the vehicle location information providing a series of geolocations of the vehicle (step 604). This may include use of the GPS unit 116 as shown in FIG. 1, for example. Based on the received vehicle location information, the method then determines a vehicle path for the vehicle, the vehicle path indicating a path traversed by the vehicle over a predetermined time period (step 606). The method also includes the step of receiving vehicle state information from the vehicle indicating different vehicle states at different time intervals within the predetermined time period (step 608), and based on the received vehicle state information, determining whether the vehicle is in a working state or a non-working state for each time interval (step 610). As a result of the determination in step 610, the computer system may then render the vehicle path on a map display, the map display visually distinguishing between sections of the vehicle path traversed while the vehicle is in the working state and sections of the vehicle path traversed while the vehicle is in the non-working state (step 612). The interface display of FIG. 14 is one example of such a differential path display.

Determining whether the vehicle is in a working state or a non-working state in step 610 allows for accurately determining when detected vehicle movements correspond to actual work in the field. In some implementations, the vehicle state is a function of PTO engagement. For example, some vehicles/implements require PTO engagement in order to actively operate, and the vehicle can therefore be determined to be in an active working state when (1) the PTO is engaged and (2) the vehicle is moving. PTO engagement may be determined using signals from the vehicle CAN bus and/or from one or more external sensors.

However, not all vehicles require PTO engagement to operate. Thus, in some implementations, determination of vehicle state additionally or alternatively utilizes readings related to external sensors, hydraulic system state, engine speed, ground speed, and/or engine torque, for example. In presently preferred embodiments, engine torque measurements obtained from the vehicle CAN bus (e.g., as percent torque required to overcome friction, typically provided by the CAN bus as a measurement ranging from 0 to 100) are primarily utilized to determine vehicle state. Engine torque has shown to be effective at indicating vehicle state across different types of vehicles. In addition, engine torque may be used to determine vehicle state without requiring customized sensor arrangements for each particular vehicle or operation.

In some embodiments, a torque threshold is defined such that when torque is above the threshold, the vehicle is determined to be in an active working state, and when torque is below the threshold, the vehicle is determined to be in a non-working state. However, because different vehicles may have different horsepower ratings, different torque thresholds specific to each vehicle may be set.

In alternative, more preferred embodiments, to minimize differences across different types of vehicles, the threshold is set according to a relative change in torque rather than a set torque measurement. For example, an increase in torque that is at or above some predetermined threshold (e.g., 10%, 25%, 50%, 75%) over a given amount of time (e.g., 2 to 5 seconds, 5 to 10 seconds, or some time period related to the measurement frequency) indicates that the vehicle has moved into an active working state, while a corresponding drop in torque indicates that the vehicle has moved into a non-working state.

Other factors may also be utilized in addition to or in the alternative to relative change in torque for determining vehicle state. For example, a floor threshold torque requirement for determining an active state may be used such that any relative changes in torque below the floor threshold do not trigger a determination that the vehicle is in an active working state. The floor threshold may be set at about 20% to 30% in a typical tractor but may be lower or higher if the tractor's horsepower rating suggests a more appropriate setting for the floor. The floor threshold requirement can minimize erroneous determinations of working state. In some circumstances, for example, there may be relatively large changes to torque even though the tractor/vehicle is in a non-working state with an overall torque value that is relatively low. That is, a typical operation will only be interested in relative changes in torque within a certain torque range potentially indicative of a working state.

Some embodiments may additionally or alternatively utilize a groundspeed ceiling for making the vehicle state determination. For example, even if torque readings are otherwise high enough to indicate an active working state for the vehicle, an excessive ground speed measurement likely indicates that the vehicle is not actually working, but may be traveling to or from a field, for example. A groundspeed ceiling may be set as appropriate for a particular application. For example, a groundspeed ceiling in a tillage or cultivation operation may be set at about 15 mph, while a groundspeed ceiling in a planting or harvesting operation may be set to about 8 mph.

Some embodiments may additionally or alternatively utilize geolocation data in making the vehicle state determination. For example, fields may be geofenced so that whether the vehicle is inside or outside of a known field can be utilized as an additional factor. Because it is unlikely that certain vehicles (e.g., harvesters) are in a working state when located outside of a predetermined field area, the vehicle state determination logic may be configured accordingly. In some situations, for example, a determination that the vehicle is in an active state may only be possible when the vehicle is also determined as being within a field.

The determined geolocation of a vehicle relative to the geolocation of one or more other vehicles may also be utilized as a factor in making the vehicle state determination. For example, as explained in more detail below in relation to FIG. 24, the degree of loading, or a loaded/unloaded state determination of a harvester and/or loading truck may be determined using received vehicle proximity information.

Location Data Smoothing

Figure 19:
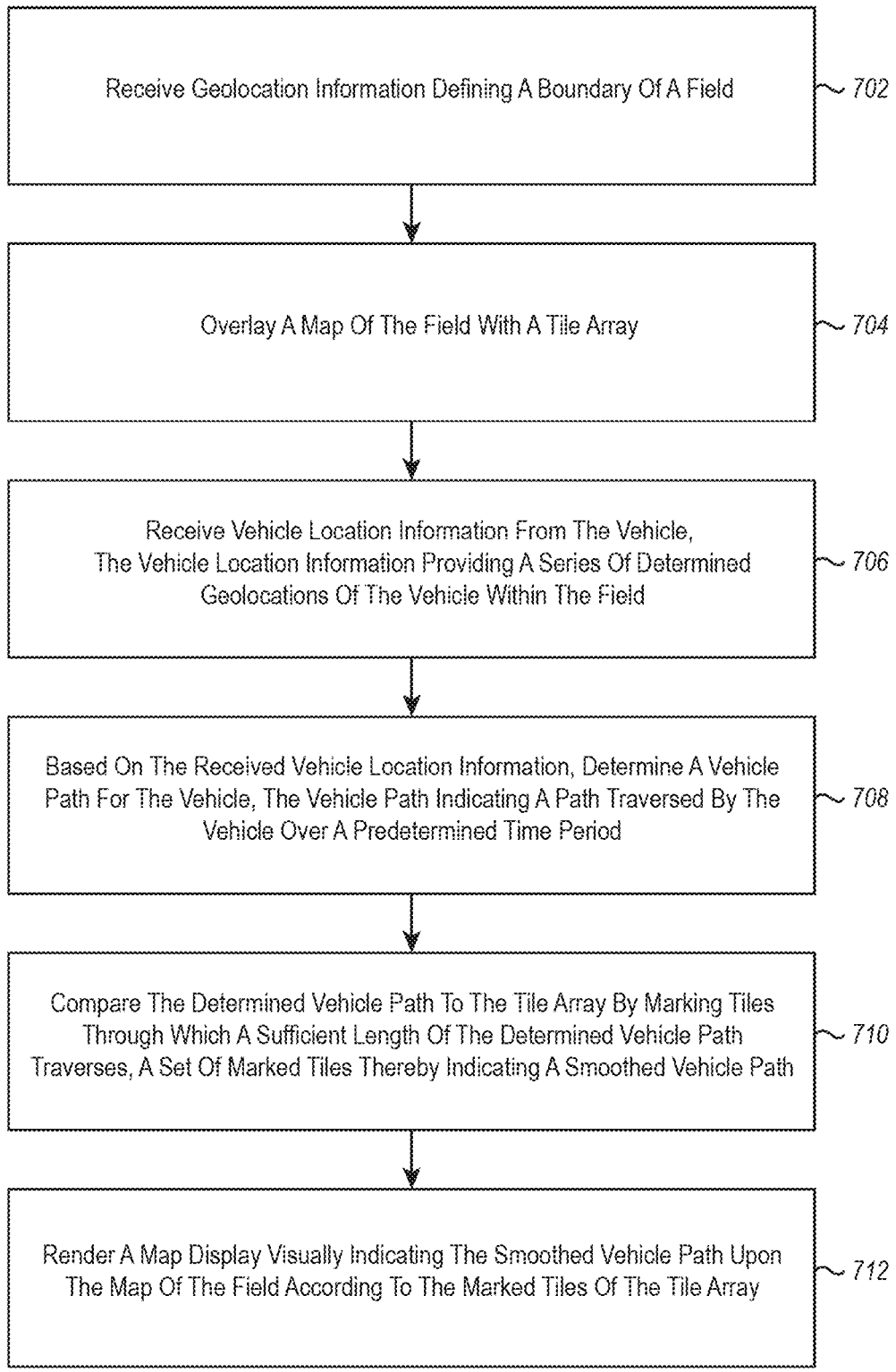
FIG. 19 is a flowchart of a method for tracking location of an agricultural vehicle and improving the rendering a path traversed by the agricultural vehicle.

FIG. 19 illustrates a flowchart of a method 700 for tracking location of an agricultural vehicle and improving the rendering a path traversed by the agricultural vehicle. The method 700 may be implanted on or performed using the computer system shown in FIG. 1. The vehicle path information resulting from performance of the method 700 may also be utilized to improve the accuracy of determining and/or rendering a vehicle path as performed in other methods described herein, including the vehicle path determination step 606 as in method 600 of FIG. 18.

The method includes the steps of receiving geolocation information defining a boundary of a field (step 702) and overlaying a map of the field with a tile array (step 704). The computer system may also receive vehicle location information from the vehicle, the vehicle location information providing a series of determined geolocations of the vehicle within the field (step 706), and based on the received vehicle location information, the computer system may determine a vehicle path for the vehicle, the vehicle path indicating a path traversed by the vehicle over a predetermined time period (step 708). As explained in more detail below, the computer system may operate to smooth the vehicle location data to provide a more accurate determination and/or rendition of the vehicle path by comparing the determined vehicle path to the tile array by marking tiles through which a sufficient length of the determined vehicle path traverses, a set of marked tiles thereby indicating a smoothed vehicle path (step 710), and rendering a map display visually indicating the smoothed vehicle path upon the map of the field according to the marked tiles of the tile array (step 712).

Figure 20:
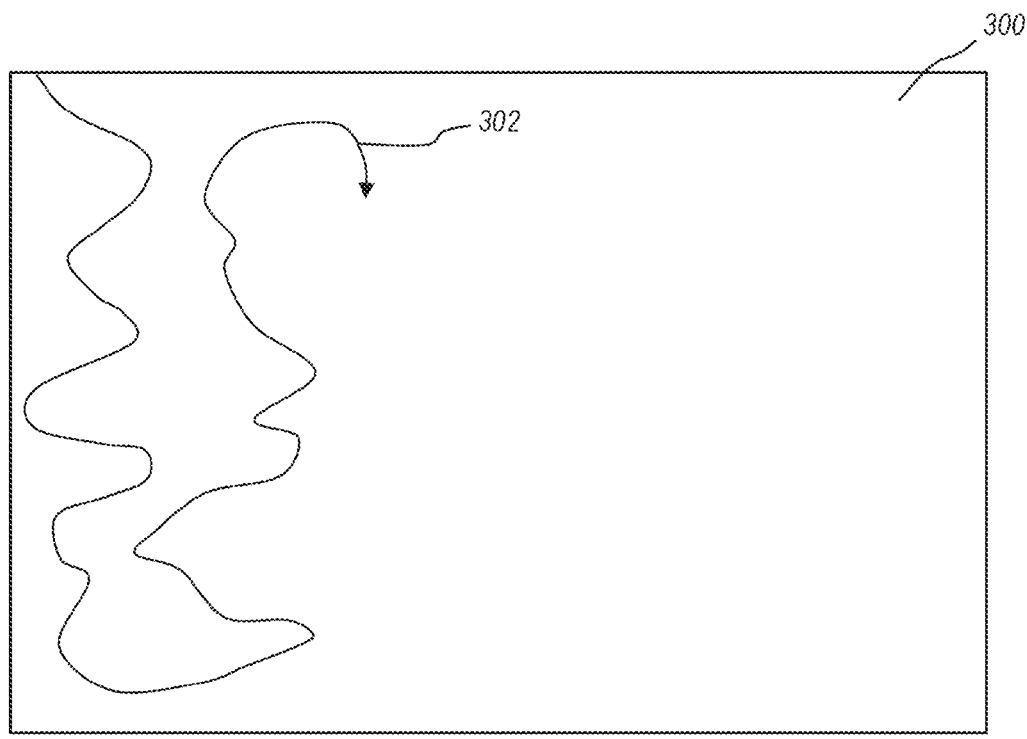
FIGS. 20 and 21 illustrate functionality of a location data smoothing operation such as shown in FIG. 19 and which may be utilized to enable useful rendering of vehicle path information based on received GPS data.
Figure 21:
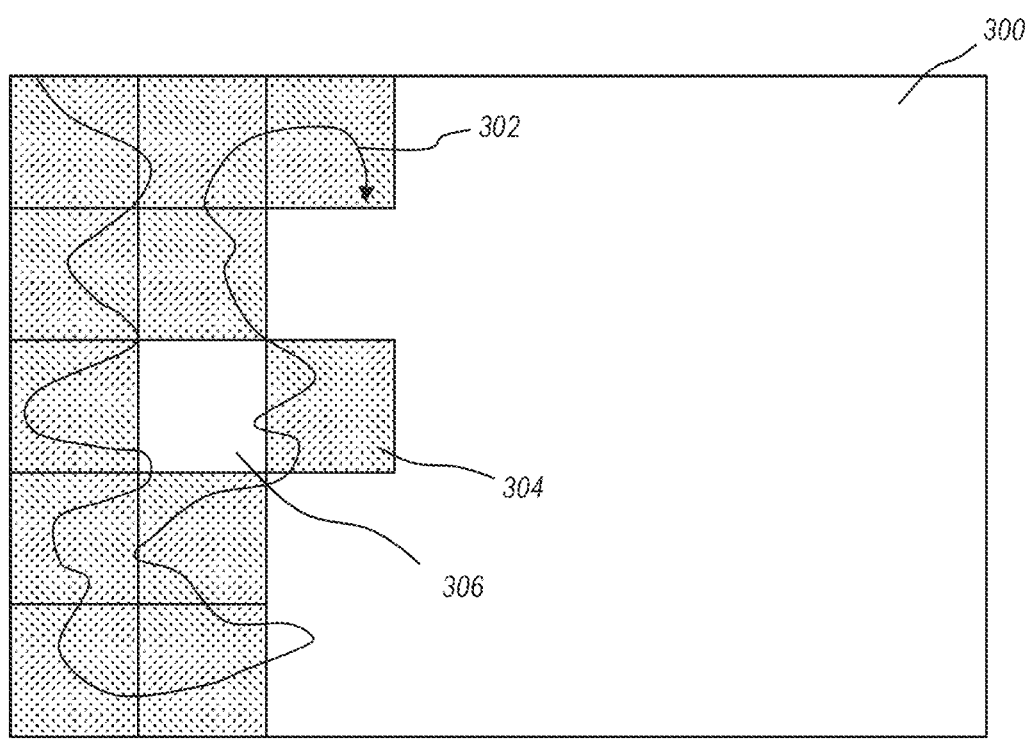

FIGS. 20 and 21 schematically illustrate use of the method 700 for smoothing vehicle location data to provide effective vehicle path information. Because a typical GPS chip can only consistently provide accuracy to within ± about 30 feet, the rendered location of a tracked vehicle will appear to "flutter" or "drift" even though the vehicle in actuality is not moving as erratically. A tracked vehicle will likely be much smaller than the dimensional accuracy of the GPS chip (an implement may only be about 20 feet wide, for example). Rendering the actual acreage that has been worked using fluttered and erratic vehicle paths is not useful. For a farm manager, it is desirable to accurately monitor how a planned operation is progressing, including what has been done, where work has been completed, and how much is left to do, without having to drive to each particular location. This requires accurate map rendering of vehicle paths.

More accurate GPS location data may be achieved using differential correction from a nearby (e.g., within about a mile) land-based signal station. However, this approach requires additional equipment along with its concomitant setup and maintenance costs, or at least the costs associated with paying third parties for access to such a base station network.

FIG. 20 illustrates vehicle path information within a field 300, showing a relatively erratic path 302 resulting from inherent GPS sensor inaccuracies. FIG. 21 illustrates operation of a tiling method to provide useful rendering of the vehicle path. As shown, the field 300 may be divided into a series of tiles 304. The field 300 may be geo-fenced to define the field boundaries. As vehicle path data is received, tiles are filled in, marked, or otherwise distinguished when the vehicle path sufficiently traverses the tiles. For example, a given tile may be filled in where a sufficient length of the vehicle path traverses the tile, where initial entry and final exit points of the tile are sufficiently distant from one another, and/or when the vehicle is determined as being within the tile for a sufficient amount of time.

In one example, a tile may be "marked" or filled in as being worked by the vehicle where a total length of the determined vehicle path passing through the tile is at least about 50% of the dimensional length of the tile, or more preferably at least about 75% of the dimensional length of the tile. For example, the length of the determined vehicle path within the tile may be shorter than the dimensional length of the tile where positioning inaccuracies place part of the vehicle path outside of the tile, and may be longer than the dimensional length of the tile where positioning inaccuracies give the illusion of a more meandering or serpentine path, or where a nearby pass of the vehicle is interpreted as crossing into the tile. The tolerances within the foregoing ranges increase accuracy by marking tiles likely to have actually been traversed while excluding those unlikely to have actually been traversed.

In some embodiments, blank tiles sufficiently surrounded by filled in tiles may also be flagged as potentially erroneous and/or may be automatically filled in. Typically, a lone portion of the field would not be skipped while portions to the front, behind, and side of the tile are worked. Similarly, lone tiles that are marked but are surrounded on four sides by unmarked tiles may be flagged or automatically deleted or moved. For example, blank tile 306 as shown in FIG. 21 may be automatically filled in and/or tile 304 may be moved or deleted. In such a scenario, it is likely that the tile 304 just to the right of blank tile 306 is an artifact of GPS inaccuracies rather than an accurate indication of the vehicle path.

Tile size may be defined as a function as GPS accuracy and/or vehicle or implement size. Typically, tile width will be about equal to or less than the width of the vehicle or implement, though not so small as to leave excessive gaps within the resulting rendition.

Asset Dispatch

In a typical harvesting operation, a harvester working a field will offload harvested produce to loading trucks, which then transport the harvested produce from the field to a storage location. Dispatch systems described herein operate to coordinate harvester and loading truck movement so as to minimize harvester downtime. The dispatch instructions may direct the loading truck to a particular location in the field, to a particular path the loading truck should take, and/or to particular gates/entry points of the field to use, for example. The loading truck may then meet with the harvester at a location where loading can commence with minimal waiting and harvester downtime.

Dispatch instructions may be provided to the operator of the loading truck by sending the instructions to a mobile device within the loading truck. The mobile device may have an application installed thereon which enables receipt and display of the dispatch instructions (see, e.g., device 150 and application interface 154 of FIG. 1).

Figure 22:
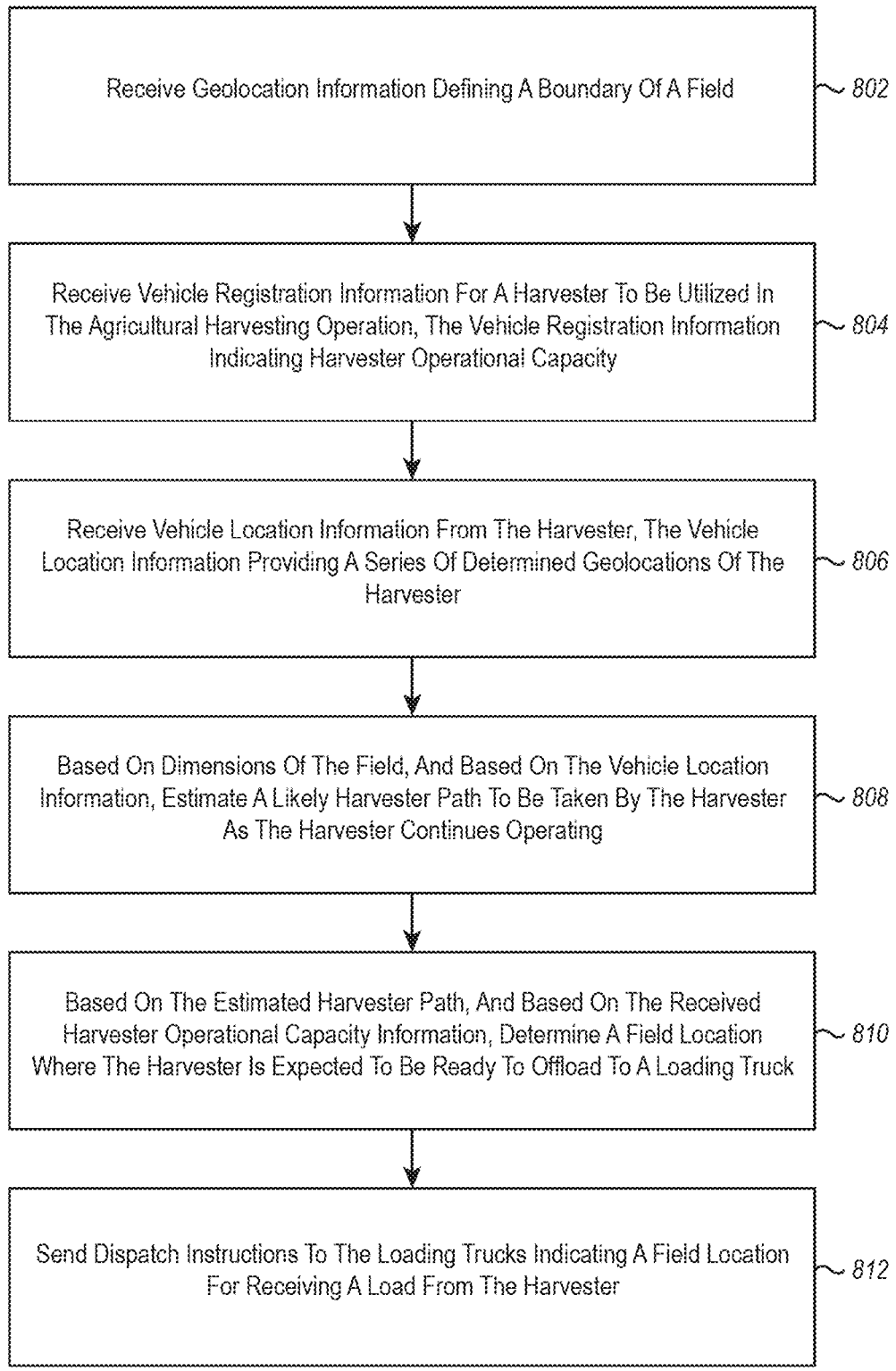
FIG. 22 is a flowchart of a method for coordinating agricultural equipment assets in an agricultural harvesting operation through the use of dispatch controls.

FIG. 22 illustrates one example of a method 800 for coordinating agricultural equipment assets in an agricultural harvesting operation through the use of dispatch controls. The method may be implanted on or performed by a computer system such as shown in FIG. 1. The method 800 includes the steps of receiving geolocation information defining a boundary of a field (step 802) and receiving vehicle registration information for a harvester to be utilized in the agricultural harvesting operation, the vehicle registration information indicating harvester operational capacity (step 804). The method also includes the steps of receiving vehicle location information from the harvester, the vehicle location information providing a series of determined geo-locations of the harvester (step 806) and based on the dimensions of the field and the vehicle location information, determining/estimating a likely harvester path to be taken by the harvester as the harvester continues operating (step 808).

Based on the estimated harvester path, and based on the received harvester operational capacity information, the computer system may then determine a field location where the harvester is expected to be ready to offload to a loading truck (step 810). The "field location" as used herein may include information such as the particular field among multiple fields at which the harvester is expected to be, the particular row or location the harvester is expected to be at within a field, the particular orientation of the harvester (which may determine which side it needs to unload on), or combinations thereof. Where multiple fields are involved, a user such as the farm manager may order the fields sequentially so that the dispatch instructions accordingly direct the vehicles to the next desired field in the desired order, and so that dispatch instructions sent to loading trucks can direct the trucks to the proper field as needed. Using the determined field location, the computer system may then send dispatch instructions to one or more loading trucks indicating the field location for receiving a load from the harvester (step 812).

Figure 23A:
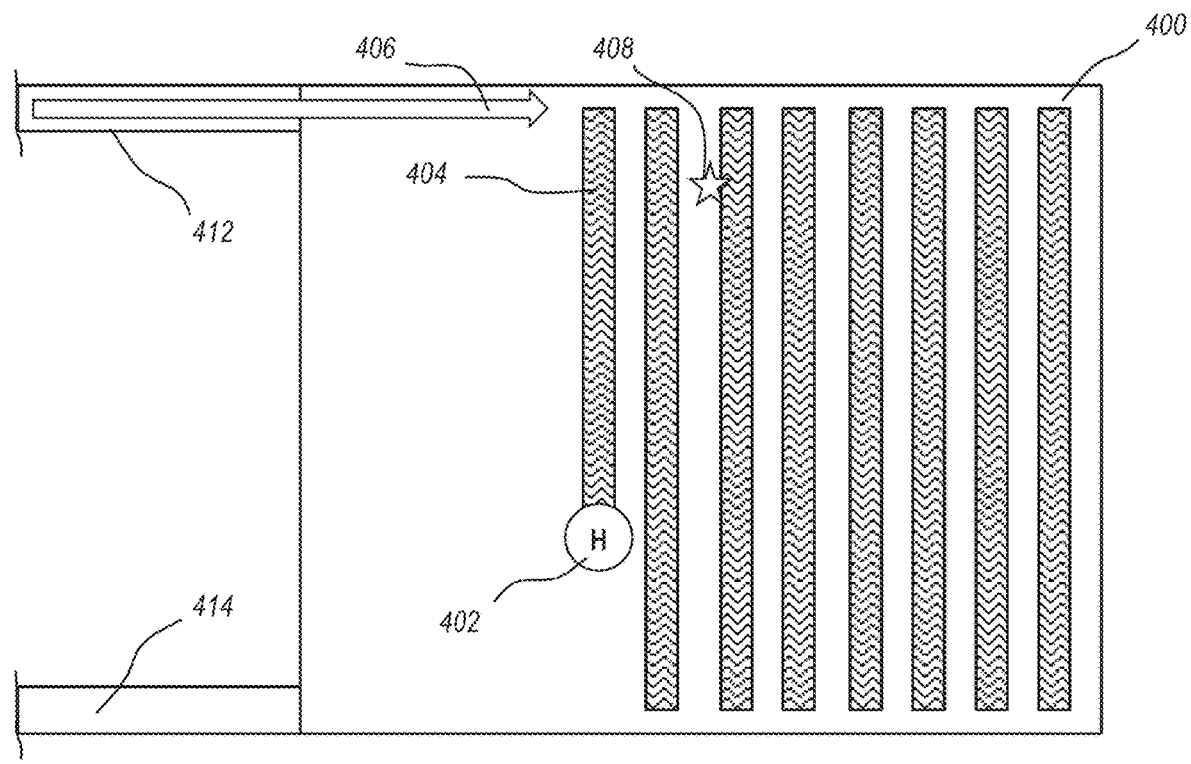
FIGS. 23A and 23B illustrate functionality of an asset dispatch operation such as one using the method of FIG. 22 for directing one or more loading trucks along a particular path and/or to a particular field location for effective interaction with a harvester.
Figure 23B:
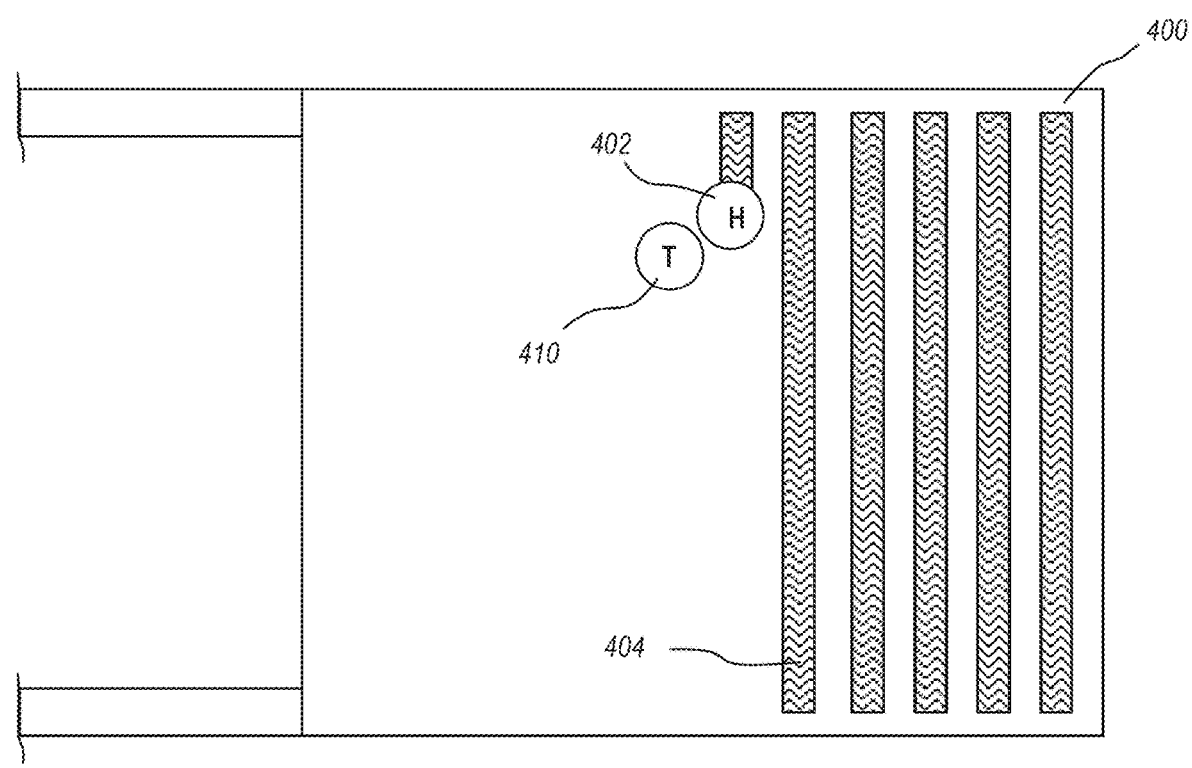

FIGS. 23A and 23B illustrates one exemplary operation of the dispatch system as described by method 800, showing an example of a display for presenting the dispatch instructions to a loading truck operator. As shown, field 400 is rendered along with the location of the harvester 402 within the field. Unharvested rows 404 may also be shown to illustrate what the field may look like in reality, though such rows 404 need not necessarily be tracked or rendered by the display. Other embodiments, for example, may use other suitable indicators (e.g., color, shading, etcetera) to differentially display harvested/worked areas from unharvested/unworked areas of the field. Based on determined factors such as harvester capacity, harvester path, average harvester speed, and field geometry, dispatch instructions are delivered to the loading truck indicating a location 408 in the field where the loading truck should travel.

For example, location 408 may represent the location where it is determined that the harvester 402 will be sufficiently full to justify unloading. The location 408 may also be determined at least in part according to proximity to a convenient loading truck path in order to minimize loading truck movement through the field. However, in a typical harvesting operation, the harvester(s) represent the bottleneck more often than the loading truck(s), and operational efficiencies usually drive a desire to keep the harvester(s) working and moving as much as possible while loading trucks move accordingly.

The display may also indicate a path 406 the truck should take to reach the location 408. For example, some fields may have multiple potential entry points. Here, it is more efficient for the loading truck to take the route 412 to enter the field as opposed to the alternative potential route 414. The indicated path 406 thereby directs the truck 410 to the location 408 so that the truck 410 can be ready for the harvester 402 when the harvester is prepared to unload, as shown in FIG. 23B. The harvester 402 may then begin offloading to the loading truck 410 without having to wait for the loading truck 410 to get to the proper position.

The dispatch system exemplified in FIGS. 23A and 23B is one example of its use. It will be understood that similar systems may be used to direct other agricultural vehicle types and/or to direct vehicles in other situations. For example, some harvesting operations may include multiple harvesters and therefore the dispatch instructions may indicate to a loading truck operator which particular harvester among multiple harvesters the operator should receive the next load from in order to minimize overall harvester downtime.

Dispatch instructions may also be utilized to direct loading trucks from the field to an unload site (e.g., storage location) in a similar manner. For example, some agricultural operations will include multiple potential unloading sites. The computer system may determine which unloading site has the shortest wait time and direct the loading truck(s) accordingly. Wait times can be determined using the received geolocation data of the loading truck(s) over time. Thus, when a loading truck's determined geolocation is sufficiently close to the unload site, it can be labelled as in a "waiting to unload" state. The number of trucks presently in such a waiting mode at an unload location and/or the previous wait times of previous trucks (e.g., a running average wait time) at the unload location can then be monitored to estimate an expected wait time at that unload location. The unload site with the shortest combination of estimated wait time and travel time may then be selected and the dispatch instructions can direct the loading truck accordingly.

The computer system can also be configured to automatically determine that a load has been unloaded from the loading truck at the storage facility in a manner similar to determining that the harvester has loaded the truck as described in relation to FIG. 24. For example, the computer system may measure a time period for which a determined geolocation of the loading truck and the geolocation of the storage facility (or particular section thereof) are within a threshold proximity to one another. A sufficient length of time (e.g., on the order of minutes as opposed to mere seconds) indicates that it is very likely that unloading has taken place.

Dispatch instructions may also be configured to direct an operator to specific areas of an unload location. This can aid in maintaining traceability of product between its harvested location in the field and its location at the storage facility (see further description below with respect to FIGS. 24 through 26). It may also aid in limiting security issues such as accidental or intentional misplacement of a load at the wrong storage location, such as one intended for another farm owner. The monitored vehicle path/location information may also be compared with the dispatch instructions sent to the vehicle to determine a level of variance between what the vehicle did and what the dispatch instructions directed the vehicle to do. Variations from the dispatch directions can be flagged for further review by the farm manager, for example.

Dispatch instructions may also be configured according to other parameters provided to the system, such as route parameters input to the system by the farm manager. For example, route parameters may include weight limits on certain roads (e.g., limiting their use when the loading truck is full), local population centers (e.g., if it is desired to avoid towns/residential areas), and/or safety parameters such as the splitting of routes to and from the field to avoid trucks passing each other continually on the same route.

Traceability

Harvester path information indicating field position of a particular load may be correlated to the loading truck the product is loaded into and correlated to the location of the load once delivered to the storage facility. Where spoilage, contamination, or other issues are determined at a particular section of the storage facility, the location or section in the field where the product at issue was harvested may be determined. In addition, the particular harvester and/or loading truck used for the particular load may be determined. Traceability may enable more rapid detection of issues by pinpointing potentially problematic sections of the field and/or potentially problematic harvesting or transporting issues.

FIG. 24 illustrates a method 900 for rendering locations of harvested agricultural produce in an agricultural harvesting operation. The method 900 may be implemented using a computer system such as shown in FIG. 1, and may be utilized, for example, to generate an interface such as shown in FIG. 14 which marks or otherwise shows different areas of a field where different loads are sourced from. In the illustrated method, the computer system receives harvester location information for a harvester, the harvester location information providing a series of determined geolocations of the harvester within a field (step 902), then based on the received harvester location information, determines a harvester path indicating a path traversed by the harvester over a predetermined time period (step 904). The computer system may also receive loading truck location information for a loading truck, the loading truck location information providing a series of determined geolocations of the loading truck (step 906). The computer system may measure a time period for which a determined geolocation of the harvester and a determined geolocation of the loading truck are within a threshold proximity to one another (step 908) and based on the measured time period, determine whether a load has been unloaded from the harvester and loaded into a loading truck (step 910). Based on one or more determinations that a load has been unloaded from the harvester, the computer system may divide the harvester path into a series of load paths, each load path corresponding to a respective load harvested by the harvester, and each load path therefore indicating an area in the field from which the respective load was obtained (step 912). The computer system may then render the harvester path on a map display, the map display indicating the separate load paths within the harvester path (step 914). This may be accomplished using operational markers such as shown in FIG. 14 and/or by differentially visualizing the different load paths in a suitable manner.

Figure 25:
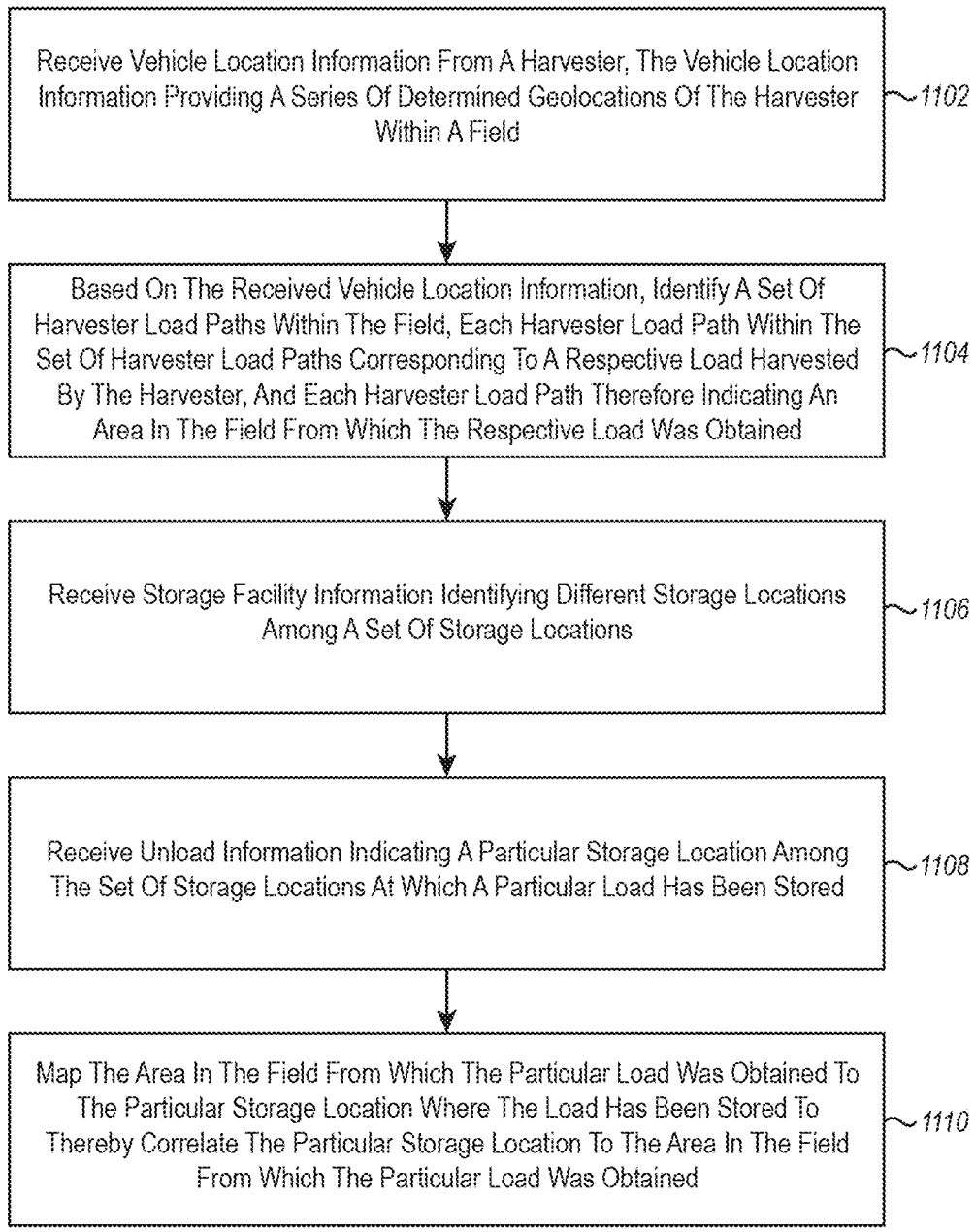
FIG. 25 is a flowchart of a method for tracing harvested agricultural produce.

FIG. 25 illustrates a method 1100 for tracing harvested agricultural produce. The method 1100 may be implemented using a computer system such as shown in FIG. 1. The computer system may receive vehicle location information from a harvester, the vehicle location information providing a series of determined geolocations of the harvester within a field (step 1102), and based on the received vehicle location information, identify a set of harvester load paths within the field, each harvester load path within the set of harvester load paths corresponding to a respective load harvested by the harvester, and each harvester load path therefore indicating an area in the field from which the respective load was obtained (step 1104). The computer system may also receive storage facility information identifying different storage locations among a set of storage locations (step 1106) and receive unload information indicating a particular storage location among the set of storage locations at which a particular load has been stored (step 1108). The computer system may then map the area in the field from which the particular load was obtained to the particular storage location where the load has been stored to thereby correlate the particular storage location to the area in the field from which the particular load was obtained (step 1110).

Figure 26:
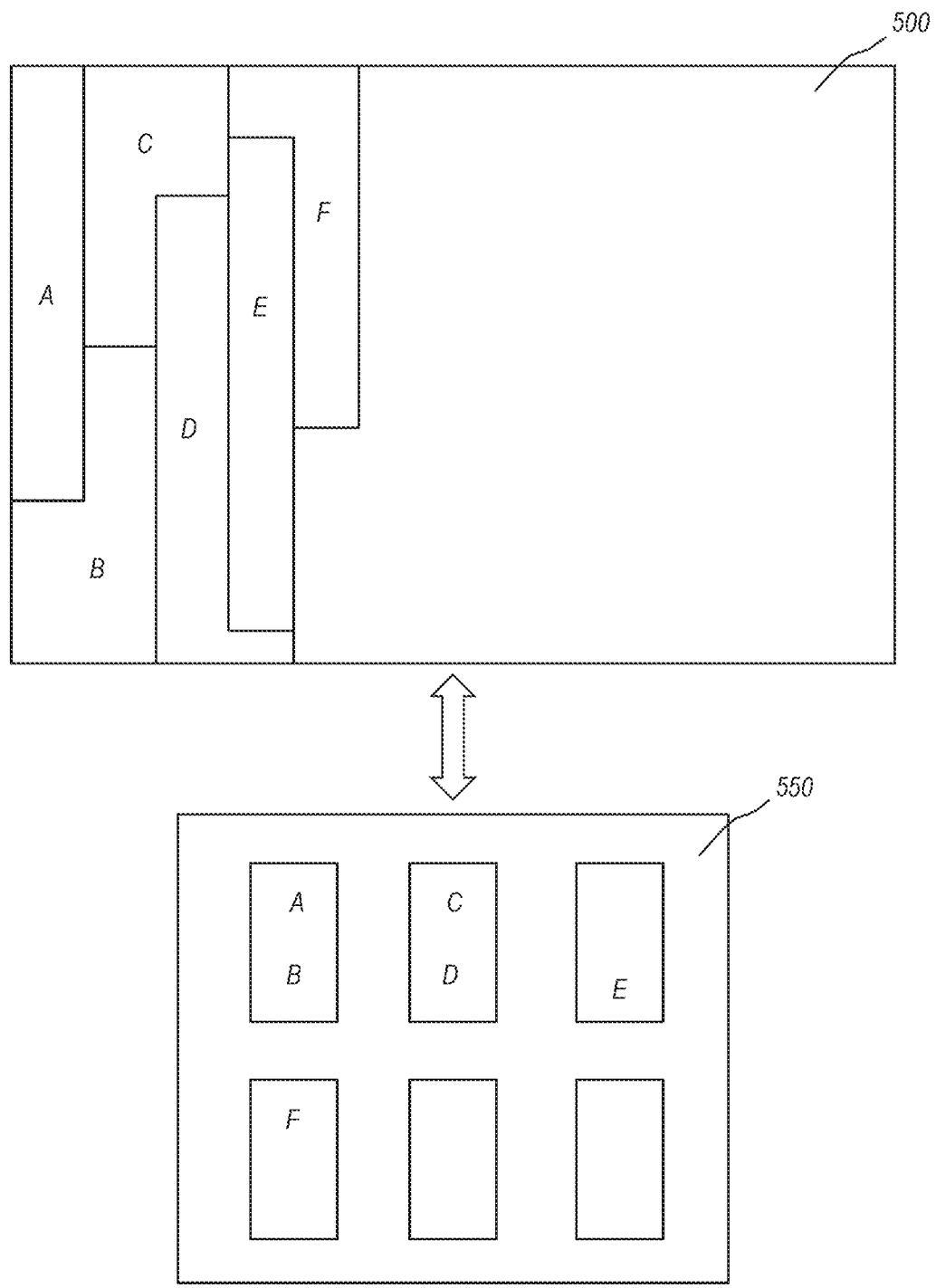
FIG. 26 illustrates functionality of a tracing operation such as one using the methods of FIGS. 24 and 25 and which may be utilized to map field origination locations of harvested produce to locations at a storage facility.

FIG. 26 shows one example of implementation of the methods 900 and 1100. FIG. 26 schematically illustrates a field 500 and a storage facility 550. As shown, separate field sections where different loads originate may be mapped to the location at the storage facility 550 where the loads are ultimately delivered. For example, section "A" in the field 500 corresponds to area "A" within the indicated storage structure of the storage facility 550, field section "B" corresponds to storage location area "B," and so on. The sections of a field from which a particular load originates may be determined using the systems and methods described herein, such as the method 900 shown in FIG. 24. Monitoring of loading trucks and the locations where they unload can also be utilized to determine the corresponding storage locations at the storage location.

Technical Effects

At least some of the embodiments described herein solve technological problems that are particular to the field of computer systems for agricultural asset management. For example, basic GPS tracking cannot accurately characterize tractor movements in a manner that enables accurate monitoring and rendering of operational progress at the level of granularity needed in agricultural operations. These types of inaccuracies inherent in the GPS vehicle location data can make it difficult or impossible to render vehicle path information in a way that usefully corresponds to actual tractor movement. Further, not all detected tractor movements will necessarily correspond to actual work being performed in the field, and distinguishing between movements that are accomplishing the desired work and other extraneous movements is crucial for properly monitoring, managing, and coordinating an agricultural operation.

Embodiments described herein solve inherent technological problems which have impeded conventional approaches to accurately rendering agricultural operation progress. As described above, embodiments may include one or more features that accurately determine vehicle state (working vs. non-working) and associate that state data with accurate geolocation information to enable accurate and useful rendering of agricultural operation progress in one or more user interfaces. Embodiments described herein may therefore be utilized to provide real-world tangible effects of increased agricultural productivity and/or efficiency.

Additional Computer System Details

Embodiments of the present invention may comprise or utilize a special-purpose or general-purpose computer system that includes computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical storage media that store computer-executable instructions and/or data structures. Physical storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, virtual or augmented reality headsets, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud computing model can be composed of various characteristics, such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth.

Some embodiments, such as a cloud computing environment, may comprise a system that includes one or more hosts that are each capable of running one or more virtual machines. During operation, virtual machines emulate an operational computing system, supporting an operating system and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A computer system configured for coordinating agricultural equipment assets in an agricultural operation, the computer system comprising:
    one or more processors; and
    one or more hardware storage devices having stored thereon computer-executable instructions which are executable by the one or more processors to cause the computer system to at least:
        receive vehicle registration information for multiple field vehicles and for at least one loading truck to be utilized in the agricultural operation;
        receive one or more vehicle operational parameters for each field vehicle, the one or more vehicle operational parameters including one or both of vehicle speed and vehicle capacity;
        receive vehicle location information from each of the field vehicles indicating positions of the field vehicles;
        render a map on a device associated with the loading truck, the map showing the positions of the multiple field vehicles;
        based on the one or more vehicle operational parameters received by the computer system, provide dispatch instructions, by way of the rendered loading truck map, directing the loading truck to a particular field vehicle among the multiple field vehicles to minimize overall downtime of the field vehicles.

2. The computer system of claim 1, wherein the agricultural operation is a harvesting operation, wherein the multiple field vehicles are harvesters, and wherein the one or more vehicle operational parameters include one or both of harvester speed or harvester capacity.

3. The computer system of claim 1, wherein the computer-executable instructions are further configured to cause the computer system to determine one or more geolocation boundaries based on geolocation information received from one or more vehicles.

4. The computer system of claim 3, wherein the one or more geolocation boundaries include field boundaries.

5. The computer system of claim 4, wherein the computer-executable instructions are further configured to cause the computer system to render the one or more field boundaries on the map.

6. The computer system of claim 1, wherein the dispatch instructions directing the loading truck to the particular harvester are configured to account for one or more of a road weight limit parameter, a population center avoidance parameter, or a safety parameter.

7. The computer system of claim 6, wherein the safety parameter accounts for route splitting to avoid separate loading trucks passing each other.

8. The computer system of claim 1, wherein the computer-executable instructions are further configured to cause the computer system to direct the loading truck to a particular unloading site among multiple unloading sites at least in part by determining which unloading site has a shortest wait time.

9. The computer system of claim 8, wherein wait times at the multiple unloading sites are determined using geolocation data received from multiple loading trucks over time, and wherein an expected wait time is determined for one or more of the unloading sites by one or both of:
    determining the number of loading trucks with determined geolocations that are sufficiently close to the unloading site to be labelled as in a state of waiting to unload; or
    determining previous wait times of loading trucks at the unloading site.

10. The computer system of claim 8, wherein the computer-executable instructions are further configured to cause the computer system to automatically determine that a load has been unloaded at the particular unloading site by determining that a determined geolocation of the loading truck and a geolocation of the unloading site are within a threshold proximity to one another for a sufficient length of time.

* * * * *